United States Patent [19]

Iwase et al.

[11] Patent Number: 5,616,079

[45] Date of Patent: Apr. 1, 1997

[54] THREE-DIMENSIONAL GAMES MACHINE

[75] Inventors: Takashi Iwase, Yokohama, Japan; Takashi Matsumoto, Mountain View, Calif.; Nobuyuki Aoshima; Norimasa Matsuura, both of Yokohama, Japan; Takashi Goto, Sagamihara, Japan

[73] Assignee: Namco Ltd., Tokyo, Japan

[21] Appl. No.: 381,992

[22] PCT Filed: Jun. 16, 1994

[86] PCT No.: PCT/JP94/00972

§ 371 Date: Feb. 15, 1995

§ 102(e) Date: Feb. 15, 1995

[87] PCT Pub. No.: WO94/28989

PCT Pub. Date: Dec. 22, 1994

[30] Foreign Application Priority Data

Jun. 16, 1993 [JP] Japan .................................. 5-169667

[51] Int. Cl.⁶ .......................................................... A63F 9/24
[52] U.S. Cl. ............................................. 463/32; 395/128
[58] Field of Search ..................................... 395/128, 130, 395/152; 463/33, 32, 31; 273/437, 433

[56] References Cited

U.S. PATENT DOCUMENTS 4,953,107 8/1990 Hedley et al. ...................... 395/152 X
4,994,989 2/1991 Usanii et al. ....................... 395/128 X

FOREIGN PATENT DOCUMENTS

| 59-99477 | 6/1984 | Japan . |
| 62-60064 | 3/1987 | Japan . |
| 64-50183 | 2/1989 | Japan . |
| 1-101265 | 7/1989 | Japan . |

*Primary Examiner*—Jessica Harrison
*Assistant Examiner*—Michael O'Neill
*Attorney, Agent, or Firm*—Oliff & Berridge

[57] ABSTRACT

An objective of the present invention is to provide a 3D games machine that can form a high-quality pseudo-3D image in real time. Segmented map information relating to a map that configures a game space is stored in a map information storage unit (110). This segmented map information contains map position information and an object number. A game space setting unit (104) reads out image information on the map from an object image information storage unit (120) on the basis of this object number, to set the games space. In this case, a plurality of types of segmented map information, of different numbers of segments, is stored in the map information storage unit (110). The game space setting unit (104) sets the game space by reading out segmented map information with a smaller number of segments as the distance between the vehicle operated by the player and the segmented map increases.

20 Claims, 21 Drawing Sheets

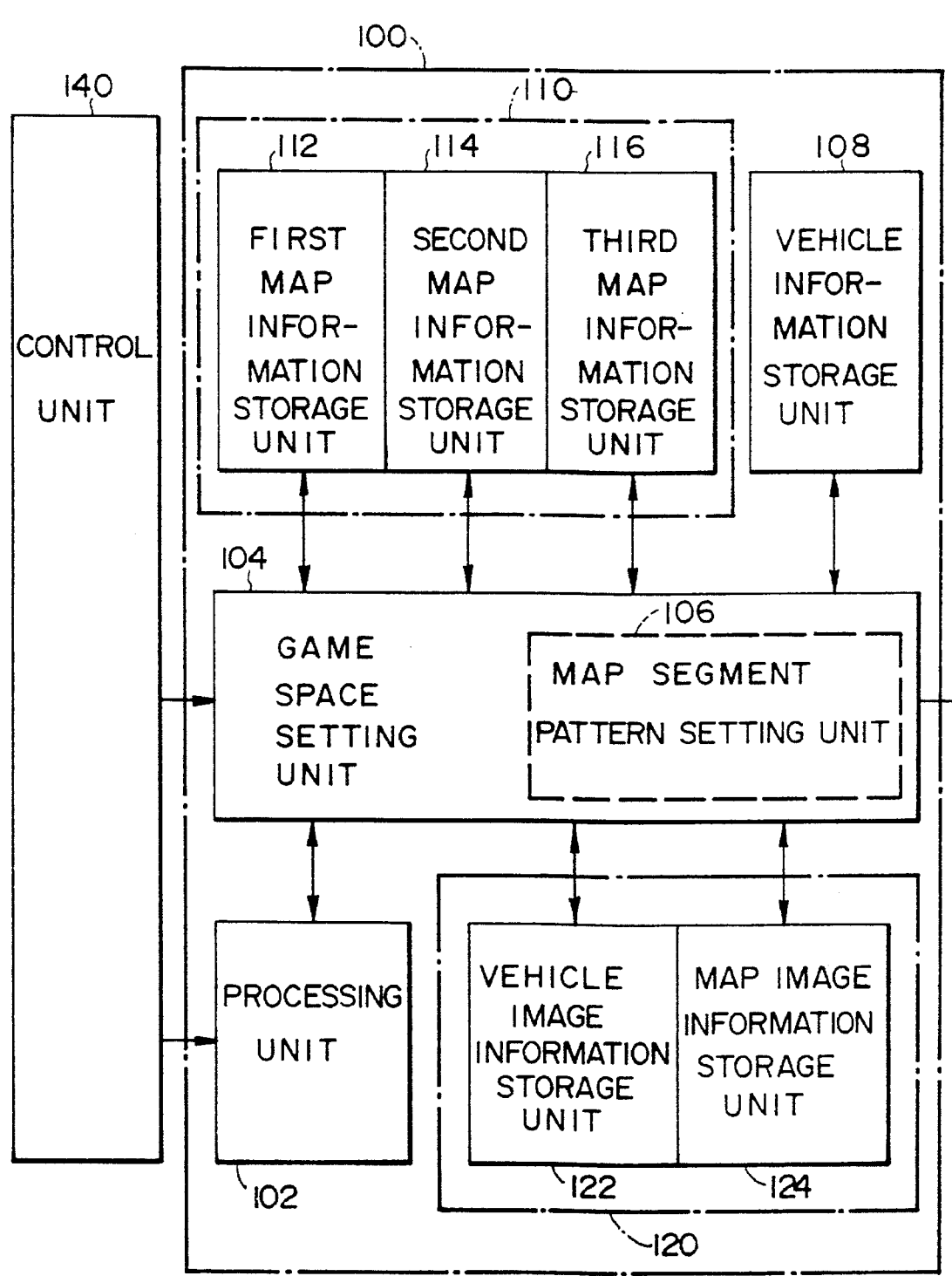

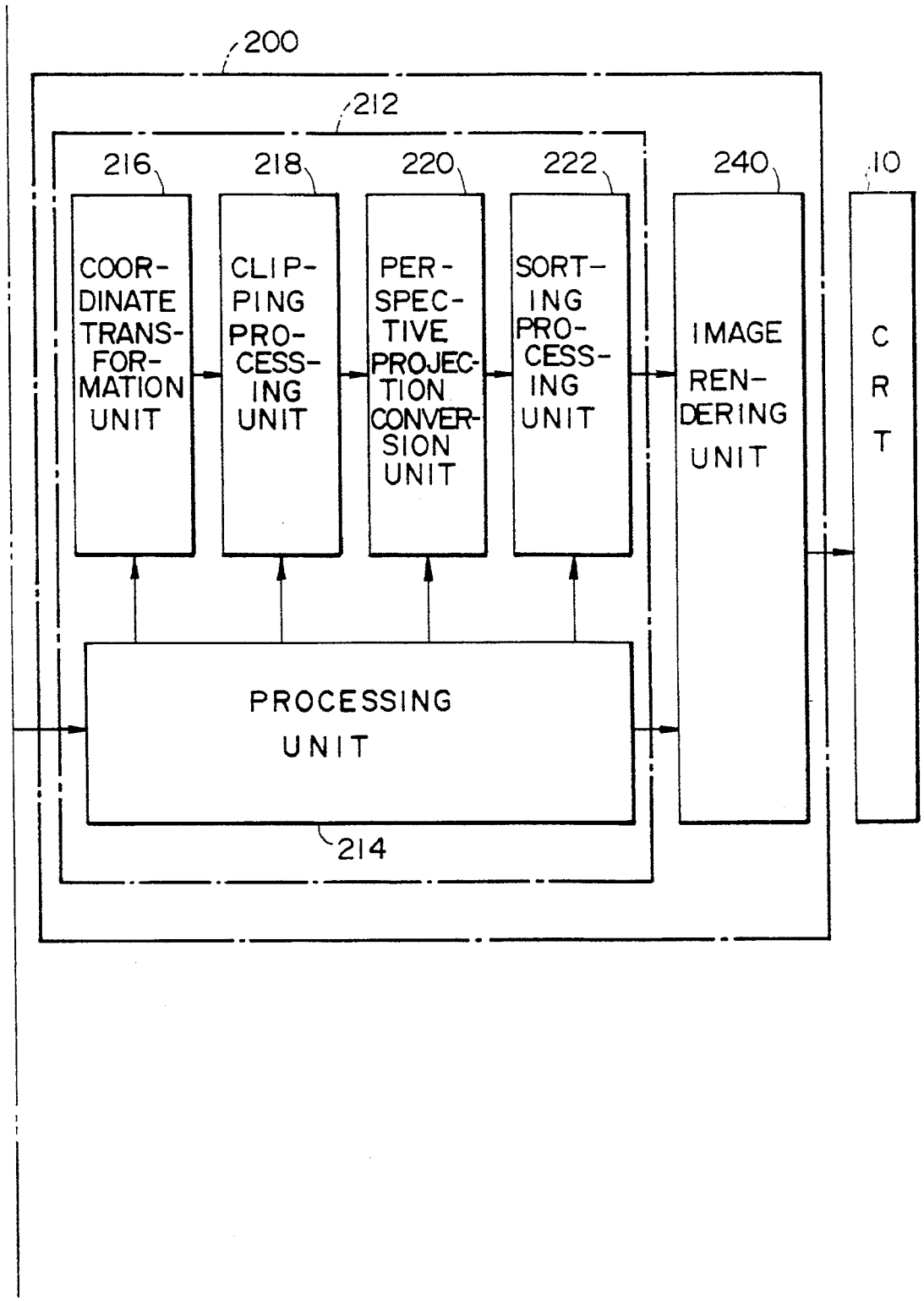

FIG. 9
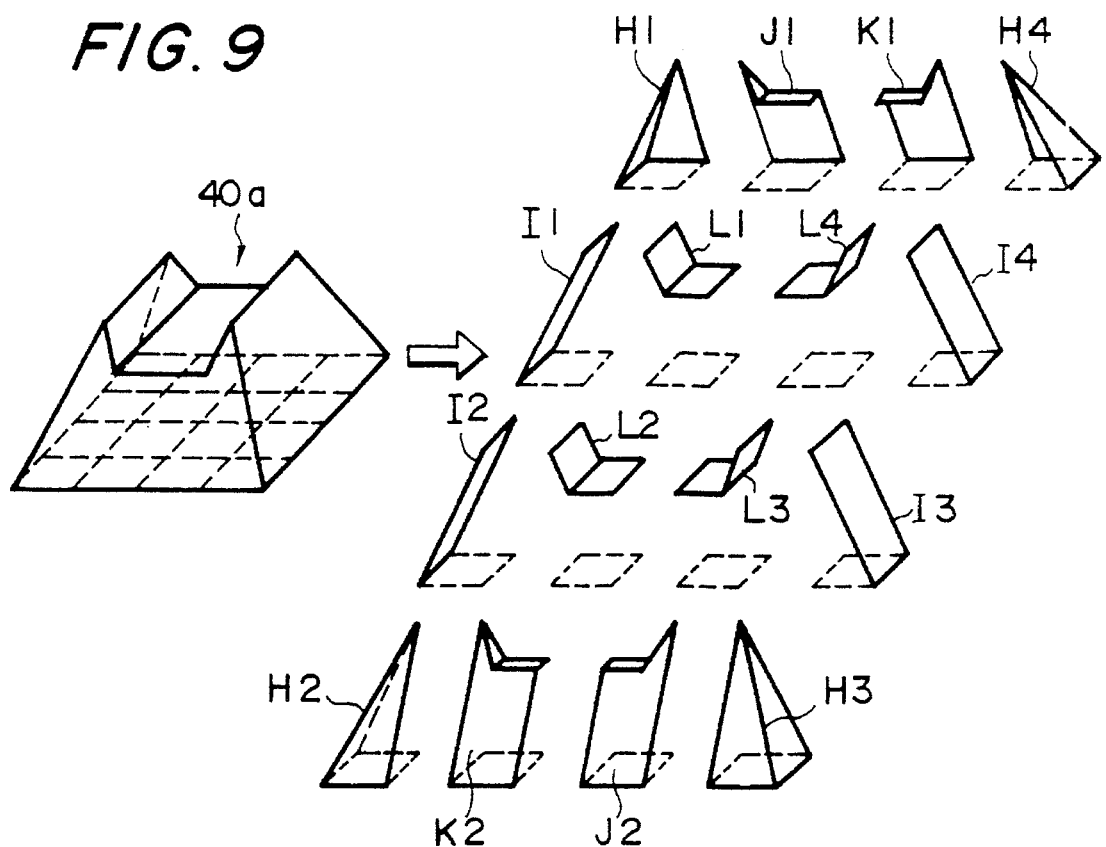
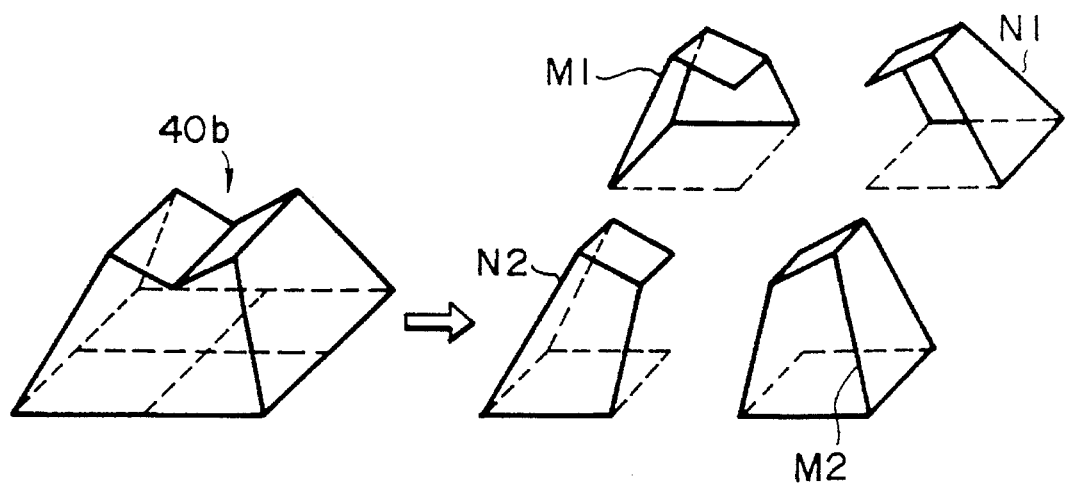
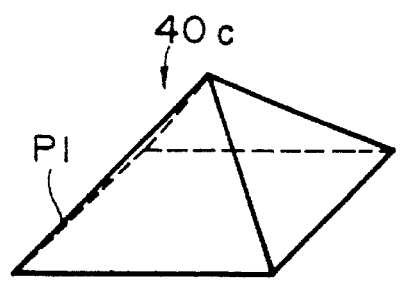

FIG. 10

| MAP AD-DRESS | POSITION INFORMATION | OBJECT NUMBER | |
|---|---|---|---|
| 1 | $X_{11}, Z_{11}$ | $OB_{11}$ | ⎫ |
| 1 | $X_{12}, Z_{12}$ | $OB_{12}$ | ⎬ FIRST SEGMENTED MAP INFORMATION |
| 1 | $X_{13}, Z_{13}$ | $OB_{13}$ | |
| ⋮ | ⋮ | ⋮ | |
| 1 | $X_{1K}, Z_{1K}$ | $OB_{1K}$ | ⎭ |
| 2 | $X_{21}, Y_{21}$ | $OB_{21}$ | ⎫ |
| 2 | $X_{22}, Z_{22}$ | $OB_{22}$ | |
| 2 | $X_{23}, Z_{23}$ | $OB_{23}$ | ⎬ SECOND SEGMENTED MAP INFORMATION |
| ⋮ | ⋮ | ⋮ | |
| 2 | $X_{2\ell}, Z_{2\ell}$ | $OB_{2\ell}$ | ⎭ |
| 3 | $X_{31}, Y_{31}$ | $OB_{31}$ | ⎫ |
| 3 | $X_{32}, Z_{32}$ | $OB_{32}$ | |
| 3 | $X_{33}, Z_{33}$ | $OB_{33}$ | ⎬ THIRD SEGMENTED MAP INFORMATION |
| ⋮ | ⋮ | ⋮ | |
| 3 | $X_{3m}, Z_{3m}$ | $OB_{3m}$ | ⎭ |

THREE-DIMENSIONAL GAMES MACHINE

FIELD OF THE INVENTION

This invention relates to a 3D games machine that moves within a virtual 3D space by means of a predetermined type of vehicle.

BACKGROUND OF THE INVENTION

A 3D games machine configured as shown in FIG. 19 is known as a prior art example of a 3D games machine that synthesizes a pseudo-3D image. This 3D games machine is configured of a control unit 510, a game space calculation unit 500, an image synthesizing unit 512, and a CRT 518, as shown in this figure. In this case, the purpose of the game space calculation unit 500 is to set a game space formed within a virtual 3D space, and is configured of a processing unit 502, a game space setting unit 504, and an image information storage unit 506. The purpose of the image synthesizing unit 512 is to form a pseudo-3D image as actually seen by a player, in accordance with settings from the game space setting unit 504, and is configured of an image supply unit 514 and an image rendering unit 516.

The operation of this prior-art example will now be described. Operating signals from the player are input to the game space calculation unit 500 through the control unit 510. An example of a game space formed within a virtual 3D space by this 3D games machine is shown in FIG. 20A. The game space calculation unit 500 places 3D objects such as a ground surface 519, mountains 520, a building 522, an installation 524, enemy aircraft 532, and the player's own aircraft 530 on a game field 540 according to operating signals and a previously stored game program, as shown in, for example, FIG. 20A.

Control of the entire 3D games machine is performed by the processing unit 502. Actual image information on the 3D objects, such as the ground surface 519, the mountains 520, the building 522, the installation 524, and the enemy aircraft 532, is stored in the image information storage unit 506. In this case, image information in which each of the 3D objects is divided into polygons and is rendered as such is stored in the image information storage unit 506, where this image information consists of polygon vertex information and auxiliary data.

The game space setting unit 504 places these 3D display objects within a virtual 3D space in accordance with operating signals from the player, the games program, and control signals from the processing unit 502. More specifically, the game space setting unit 504 adds the image information read out from the image information storage unit 506 with data that determines the positions and orientations of this image information, then outputs them to the image supply unit 514.

The image supply unit 514 performs processing such as transforming the coordinates of the thus-input data from an absolute coordinate system to a viewpoint coordinate system, clipping processing to exclude data that is outside the visual field, perspective projection conversion to a screen coordinate system, and sorting, then outputs the thus-processed data to the image rendering unit 516.

The image rendering unit 516 renders the image information that is to be seen by the player in practice, from the thus-input data. That is, since the data input from the image supply unit 514 consists of image information formed of data such as polygon vertex information, the image rendering unit 516 renders image information within these polygons from this polygon vertex information. After being processed, these data are output to the CRT 518 where they are rendered as a virtual 3D image as shown in FIG. 20B.

With the above described prior-art example, the image information consists of 3D objects represented simply by polygons, these 3D objects are all placed within a virtual 3D space, and thus a pseudo-3D image as seen from the player is rendered. The method of this prior-art example has advantages in that both the data processing flow and the previously prepared data are simple. However, it has a disadvantage in that, since the 3D objects are all rendered at the same level of resolution and also the processing places them all within the virtual 3D space, the amount of data to be processed becomes huge. This means that hardware limitations make it difficult to provide an image display in real time, resulting in problems such as extremely sluggish movement of the player's viewpoint, skip of the display of pictures as if they were separate photographs, and the failure of many objects to be displayed. The 3D games machine of this prior-art example has thus been unable to overcome the technical problems involved in producing a high-quality image display in real time.

This invention is intended to surmount the above technical problems, and has as an objective thereof the provision of a 3D games machine that can form a high-quality pseudo-3D image in real time.

SUMMARY OF THE INVENTION

In order to solve the above described problems, a 3D games machine relating to a first aspect of this invention forms a game space such that a player is enabled to move in a predetermined vehicle within a virtual 3D space by operating an operating means, wherein the 3D games machine comprises:

a map information storage means in which at least position information and an object number of a segmented map formed by dividing a map of the game space into a predetermined number of segments are stored as segmented map information;

an object image information storage means in which object image information specified by the object number is stored; and a game space setting means for reading the segmented map information from the map information storage means and for setting a game space by reading out the object image information from the object image information storage means on the basis of the thus read-out segmented map information; and wherein:

the map information storage means stores a plurality of types of the segmented map information, of different numbers of segments, and the game space setting means reads out segmented map information with a smaller number of segments as the distance between the vehicle operated by the player and the segmented map increases.

In accordance with this first aspect of the invention, a map that forms the game space, such as a map for rendering a ground surface and mountains or a map for rendering meteorites and planets in outer space, is divided into a predetermined number of segments. The configuration is such that details such as position information and object number of the segmented map are stored as segmented map information. A game space setting means reads corresponding object image information from an object image information storage unit, based on the object number within the thus segmented map information, and uses this to set the game space. In other words, it sets the display of an image of a certain segmented map at a certain position, within a virtual 3D space. In this case, a plurality of types of segmented map information, of different numbers of segments, is stored in the segmented map information storage means of this invention. The game space setting means obtains the distance between the vehicle operated by the player and each segmented map, and reads out segmented map information of a lower number of segments as this distance increases. For example, first, second and third segmented map information could be configured of the same map divided into k, l, and m data items, respectively (k>l>m). In this case, the game space setting means selects the first segmented map information when the distance between the vehicle and this segmented map is short, the second segmented map information when the distance is intermediate, and the third segmented map information when the distance is long. In this manner, an image display is enabled in which a map close to the vehicle can be shown at a high resolution whereas a map far therefrom can be shown simplified. This means that not only can the amount of data to be processed in real time be reduced, but also a high-quality pseudo-3D image can be rendered, enabling the provision of a highly realistic 3D game.

A second aspect of this invention relates to a 3D games machine which forms a game space such that a player is enabled to move in a predetermined vehicle within a virtual 3D space by operating an operating means, wherein the 3D games machine comprises:

a map information storage means in which at least position information and an object number of a segmented map formed by dividing a map of the game space into a predetermined number of segments are stored as segmented map information;

an object image information storage means in which object image information specified by the object number is stored; and a game space setting means for reading the segmented map information from the map information storage means and for setting a game space by reading out the object image information from the object image information storage means on the basis of the thus read-out segmented map information; and wherein:

the object image information storage means stores a plurality of types of object image information for an object to be displayed, including object image information from which detailed portions are omitted and object image information which has the detailed portions;

the map information storage means stores, for the same map, a plurality of types of segmented map information including segmented map information that specifies object image information from which the detailed portions are omitted and segmented map information that specifies object image information which has the detailed portions; and the game space setting means reads a plurality of types of segmented map information including segmented map information that specifies object image information from which the detailed portions are omitted and segmented map information that specifies object image information which has the detailed portions, for portions within a map for which detailed rendering is necessary, or segmented map information that specifies object image information from which the detailed portions are omitted, for portions within a map for which detailed rendering is not necessary, and sets a game space by superimposing object images that are read out in accordance with this segmented map information.

In accordance with this second aspect of the invention, a plurality of types of object image information are stored in the object image information storage means for each object to be displayed, including object image information from which detailed portions are omitted and object image information which has these detailed portions. For example, if an object to be displayed is a mountain with a hut on the peak, image information for the mountain itself could be stored as the object image information without detailed portions and image information for the hut could be stored as the object image information which has detailed portions. Similarly, a plurality of types of segmented map information is stored in the map information storage means, including segmented map information specifying the mountain's image information and segmented map information specifying the hut's image information. For portions within the map for which detailed rendering is necessary, the game space setting means reads out a plurality of types of segmented map information including both the segmented map information specifying the mountain and the segmented map information specifying the hut. On the other hand, for portions within the map for which detailed rendering is not necessary, only the segmented map information specifying the mountain is read out. The game space is set by superimposing the object images read out in accordance with this segmented map information. As described above, the present invention enables the rendering of superimposed images, such as those of a mountain and a hut, for portions within a map for which detailed rendering is necessary. For portions within the map for which detailed rendering is not necessary, the present invention can render a single image such as that of the mountain alone. This means that a high-resolution image can be displayed for portions within a map for which detailed rendering is necessary, thus providing a high-quality image. On the other hand, the resolution is low for portions within the map for which detailed rendering is not necessary, so that the amount of data required for image display can be reduced. Note that the present invention can of course be embodied in a form such that a plurality of types of object image information of different resolutions could be provided as object image information that has detailed portions, and a plurality of types of segmented map information specifying this object image information could be provided.

In a third aspect of this invention, the game space setting means selects the object image information according to the object number in such a manner that an object that is placed in the segmented map is rendered in a simplified form as the distance between the vehicle operated by the player and the segmented map increases.

In accordance with this third aspect of the invention, object image information in which objects are simplified is selected for a segmented map at a position far from the vehicle. In other words, not only is the number of segments reduced for a segmented map at a position far from the vehicle, but also the objects forming this segmented map are simplified. Conversely, not only is there a larger number of segments for a segmented map at a position close to the vehicle, but also objects forming this segmented map are rendered in more detail. This reduces the amount of data to be processed in real time and also enables the rendering of a high-quality pseudo-3D image.

A fourth aspect of this invention is further provided with means for previously storing a plurality of map segment patterns corresponding to a positional range of the vehicle operated by the player and the player's line-of-sight directional range, wherein:

the game space setting means sets the game space by selecting one of the plurality of map segment patterns on the basis of the position of the vehicle and the player's line-of-sight direction, while the game is in progress.

In accordance with this fourth aspect of the invention, a plurality of map segment patterns are previously stored to correspond with the positional range of the vehicle operated by the player and the player's line-of-sight directional range. The game space setting means sets the game space by selecting one of this plurality of map segment patterns on the basis of the position of the vehicle and the player's line-of-sight direction, while the game is in progress. For example, assume that a map segment pattern P11 corresponding to a first positional range and a first line-of-sight directional range and a map segment pattern P21 corresponding to a second positional range and the first line-of-sight directional range are stored. Similarly, assume that a map segment pattern P22 corresponding to the second positional range and the second line-of-sight directional range is stored. When the vehicle position is in the first positional range and the player's line-of-sight direction is within the first line-of-sight directional range, the map segment pattern P11 is selected. The map that forms the game space is segmented in accordance with this map segment pattern P11. When the vehicle moves such that it enters the second positional range but the line-of-sight directional range remains unchanged, map segment pattern P21 is now selected. In this state, if the player's line-of-sight direction changes so that it is now within the second line-of-sight directional range, the configuration is such that now the map segment pattern P22 is selected. With a configuration of this form, in which the map segment pattern is selected in accordance with the vehicle's position and the player's line-of-sight direction, the calculation processing required for image synthesis is such that it is imposed only on the segmented map within the range selected by that map segment pattern. This enables a huge reduction in the amount of data that the device has to calculate in real time, and thus enables the synthesis of a high-quality image in real time. Note that, in an apparatus in which the player's field-of-view image also changes when the direction of the vehicle operated by the player has changed, the player's line-of-sight direction can be considered to be the same as the vehicle's direction. In contrast, in an apparatus that uses means such as a head-mounted display, the configuration could be such that the player's line-of-sight direction is detected by means such as spatial sensors and the selection of the appropriate map segment pattern is based on the resultant detection.

In a fifth aspect of this invention, the game space setting means generates a map segment pattern while the game is in progress, based on the position of the vehicle and the player's line-of-sight direction, and sets a game space on the basis of the map segment pattern.

In accordance with this fifth aspect of the invention, a map segment pattern is not previously stored; it is generated sequentially while the game is in progress on the basis of the position of the vehicle and the line-of-sight direction. The configuration is such that the map that forms the game space is segmented on the basis of the thus generated map segment pattern.

A sixth aspect of this invention is further provided with an image synthesizing means for calculating the player's field-of-view image in the virtual 3D space and synthesizing a pseudo-3D image on the basis of game space setting information from the game space setting means; wherein:

the image synthesizing means omits clipping processing during the synthesis of the pseudo-3D image, for regions which are always within the player's field-of-view range at any position within the positional range of the vehicle.

In accordance with this sixth aspect of the invention, clipping processing is omitted during the synthesis of the pseudo-3D image for regions which are always within the player's field-of-view range at any position within the positional range of the vehicle. In other words, these regions are areas where image display must always be performed, so they are designated to be clipping-unnecessary regions. Since clipping processing is the most time-consuming part of the image synthesis, this omitting of clipping processing in these regions can help to greatly shorten the calculation time. This enables a further increase in the immediacy of the image processing.

A seventh aspect of this invention is further provided with an image synthesizing means for calculating the player's field-of-view image in the virtual 3D space and synthesizing a pseudo-3D image on the basis of game space setting information from the game space setting means; wherein:

the image synthesizing means synthesizes the image by giving priority to image information close to the position of the vehicle operated by the player.

In accordance with this seventh aspect of the invention, the image synthesis process gives priority to image information close to the position of the vehicle. This means that if, for example, calculation processing cannot be completed within one frame, only data for positions far from the vehicle drops out; there are no drop-outs of data for positions close to the player. The data from positions far from the player has been simplified as described above, so that even if such data does drop out, the player will not notice any effect. This ensures that an image of a high level of quality can be maintained.

BRIEF DESCRIPTION OF THE DRAWINGS

FIG. 1 (1A and 1B) is a block diagram of one example of an embodiment of this invention;

FIG. 9 is a schematic view illustrative of an object placed in segmented maps;

FIG. 10 shows an example of the data format of segmented map information;

DESCRIPTION OF THE PREFERRED EMBODIMENT

1. Outline of Game

An example of a 3D game implemented by the 3D games machine of this invention will first be described briefly.

Figure 2:
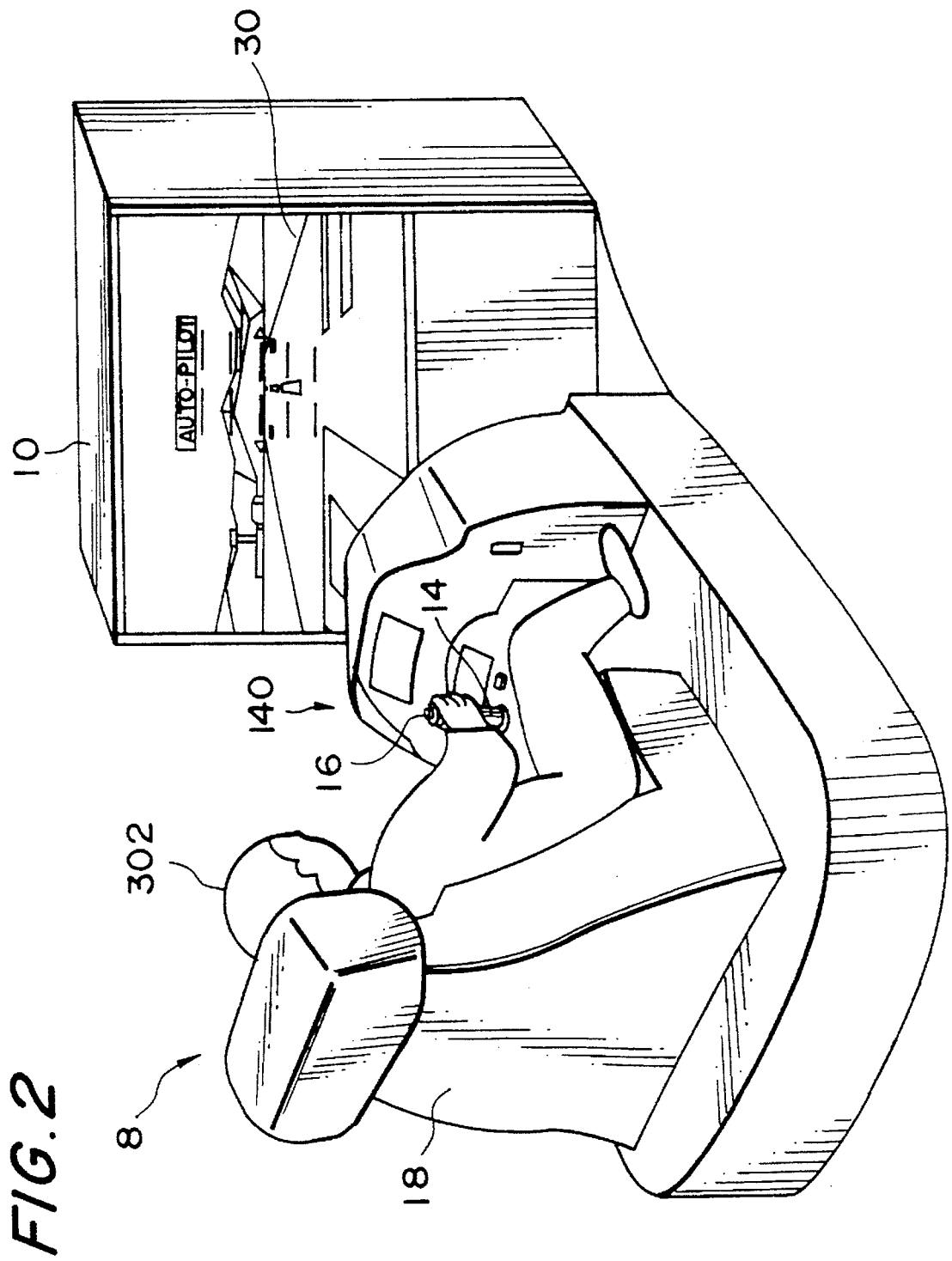
FIG. 2 is a schematic view of the exterior of this 3D games machine.

The 3D game implemented by this 3D games machine is a fighter aircraft simulator in which the player "flies" freely around a virtual 3D space in his own fighter, to destroy targets such as enemy planes and enemy bases. An external view of this 3D games machine is shown in FIG. 2. The 3D games machine of this embodiment has a cockpit portion 8 with a display device arranged in front of it, such as a CRT 10.

The cockpit portion 8 is configured to imitate the pilot compartment of a fighter aircraft, and the CRT 10 is positioned before a player 302 seated in a seat 18. When the player 302 operates a control unit 140 to start the game, a pseudo-3D image 30 appears on the CRT 10. This pseudo-3D image 30 is projected as pseudo-3D images within a virtual 3D space as seen by the player, and, in the example shown in FIG. 2, the pseudo-3D image 30 is projected as if a fighter aircraft piloted by the player is taking off from an airport. The player 302 operates a joystick 14 provided in the control unit 140, as shown in FIG. 2, to pilot the player's own fighter. The player 302 can also attack enemy bases and fighters by means such as a firing button 16 mounted on the joystick 14.

Figure 3A:
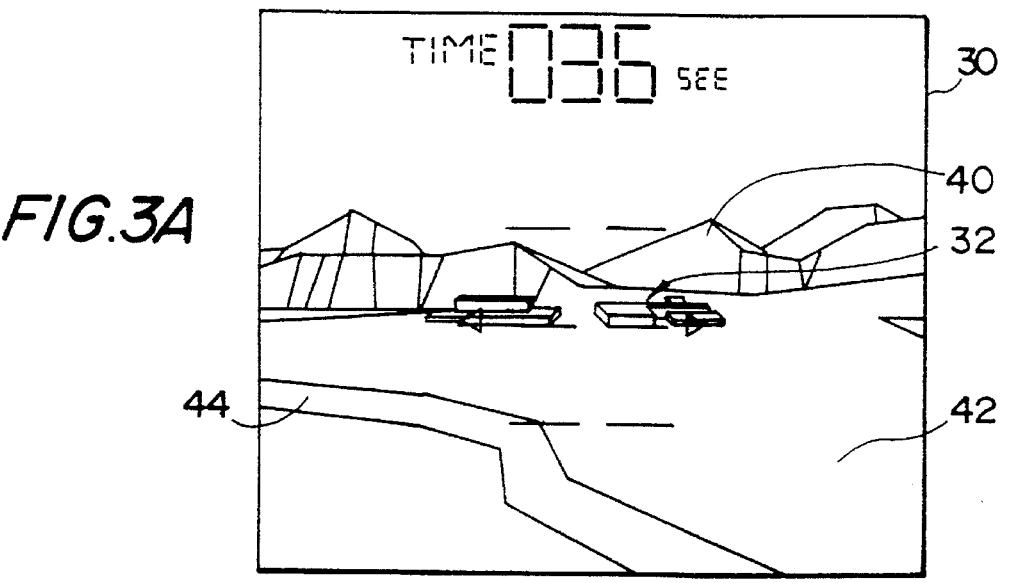
FIG. 3A, FIG. 3B, and FIG. 3C are schematic views of examples of pseudo-3D images synthesized by this 3D games machine.
Figure 3B:
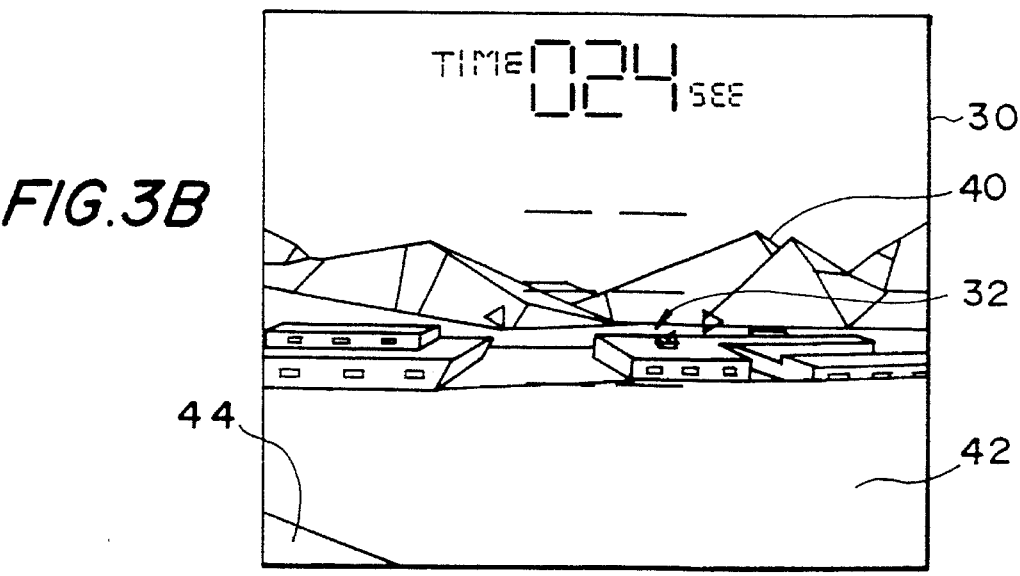
Figure 3C:
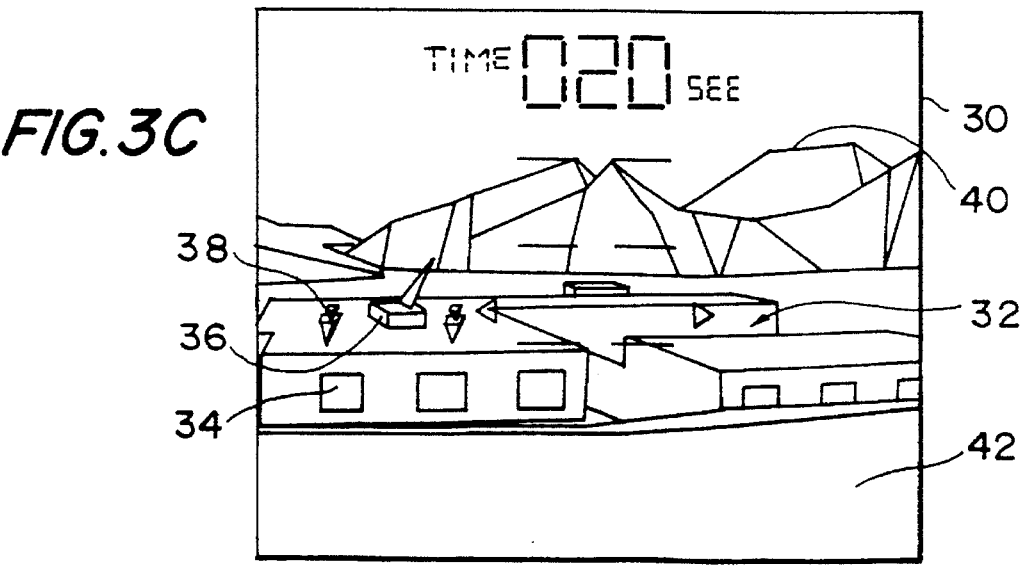

An example of the pseudo-3D image 30 seen when the player 302 is attacking an enemy base 32 is shown in FIG. 3A to FIG. 3C. As shown in FIG. 3A, this pseudo-3D image 30 is rendered to include a map image consisting of the enemy base 32, mountains 40, and a ground surface 42. The pseudo-3D image 30 when the player's fighter has moved from the state shown in FIG. 3A to one close to the base 32 is shown in FIG. 3B, and the pseudo-3D image 30 when the player's fighter has moved even closer to the base 32 is shown in FIG. 3C. The map image of the base 32, the mountains 40, the ground surface 42, and a river 44 shown in FIG. 3B is rendered with more detail than the map image of FIG. 3A. Similarly, the map image of FIG. 3C is rendered in even more detail. For example, in FIG. 3C, details such as windows 34 and an antiaircraft (AA) gun mount 36 of the enemy base 32, as well as people 38 on top of the base 32, are formed as clearly visible map images. The surfaces of the mountains 40 are also rendered in even more detail. This description could be rephrased in such a manner that the map image is formed to be sequentially simplified in FIG. 3B with respect to FIG. 3C, and in FIG. 3A with respect to FIG. 3B. In other words, in order to give the player the impression that this is a high-quality game image, it is necessary to render it in detail as shown in FIG. 3C in the vicinity of the player's own fighter. In contrast, there would be no real problem in practice if the map images of elements such as enemy base 32 and the mountains 40 that are located far from the player's fighter were not rendered in such detail. Even with such rendering, the player cannot be prevented from acknowledging that this is a high-quality game image.

Therefore, the 3D games machine of this embodiment is configured in such a manner that the map images of objects positioned far from the player's own fighter are simplified and those of objects positioned close thereto are rendered in more detail, as will be described later. This enables a huge reduction in the amount of data to be processed in real time, improves the speed at which the player's viewpoint moves, and prevents problems such as skip in the picture. As a result, a high-quality game image can be implemented in real time.

Figure 4A:
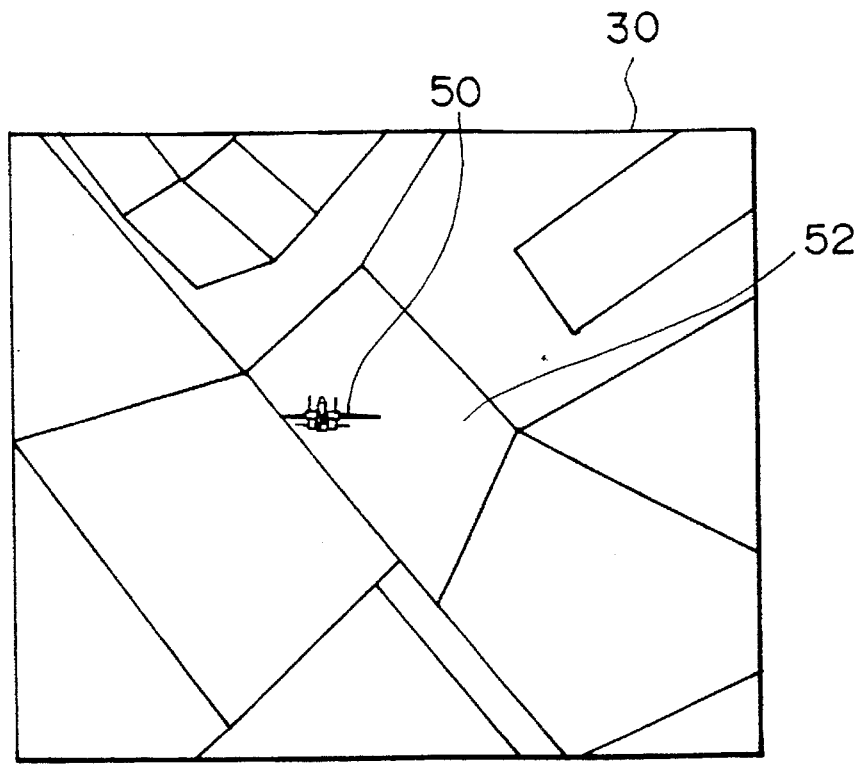
FIG. 4A and FIG. 4B are schematic views of other examples of pseudo-3D images synthesized by this 3D games machine.
Figure 4B:
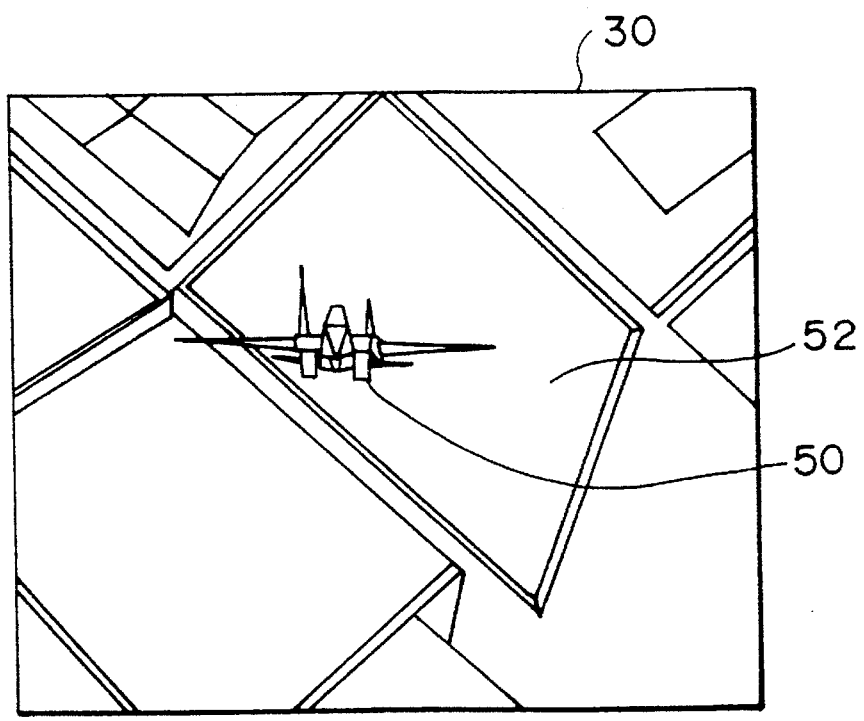

An example of the pseudo-3D image when the fighter piloted by the player attacks an enemy fighter 50 is shown in FIG. 4A and FIG. 4B. The pseudo-3D image 30 shown in FIG. 4A includes the enemy fighter 50 which is a 3D object, and elements such as an enemy base 52 which is a map image.

FIG. 4B projects the pseudo-3D image 30 as if the player's fighter is even closer to the enemy fighter 50 than it is in FIG. 4A. In this case, the enemy fighter 50 in FIG. 4B is rendered in more detail than in FIG. 4A. Thus the player can be made to feel that he is attacking the enemy fighter 50, which greatly increases the realism of the game. Since the player's fighter is diving steeply in FIG. 4B in order to attack the enemy fighter, the map image of an element such as the enemy base 52 is projected in more detail and this can further increase the realism of the game.

Once the fighter piloted by the player has finished attacking the enemy base and fighters, it can be made to return to its airport, ending the game. Note that the above description is concerned to a one-player game, but it can equally well be applied to a multi-player type of game for two or more people.

2. Description of Overall Configuration

A block diagram of one embodiment of a 3D games machine in accordance with the present invention is shown in FIG. 1.

As shown in FIG. 1, this 3D games machine is configured to comprise the control unit 140 to which the player inputs operating signals, a game space calculation unit 100 that sets a game space in accordance with a predetermined game program, an image synthesizing unit 200 that creates a pseudo-3D image as seen from the player's viewpoint position, and the CRT 10 that outputs the pseudo-3D image.

When this 3D games machine is configured as a driving simulator, for instance, the control unit 140 could be connected to controls such as a steering wheel and gear lever for "driving" a sports car, and it could input operating signals from those controls. When the 3D games machine is configured as the above dog-fight type of game, the control unit 140 will be connected to the joystick 14 for piloting the fighter and the firing button 16 for firing weapons such as a machine gun and/or missiles.

The game space calculation unit 100 is configured to comprise a the processing unit 102, a game space setting unit 104, a vehicle information storage unit 108, a map information storage unit 110, and an object image information storage unit 120.

The processing unit 102 provides control over the entire 3D games machine. A memory section provided within the processing unit 102 stores a predetermined game program. The game space calculation unit 100 is designed to set a game space in accordance with this game program and operating signals from the control unit 140.

Figure 5:
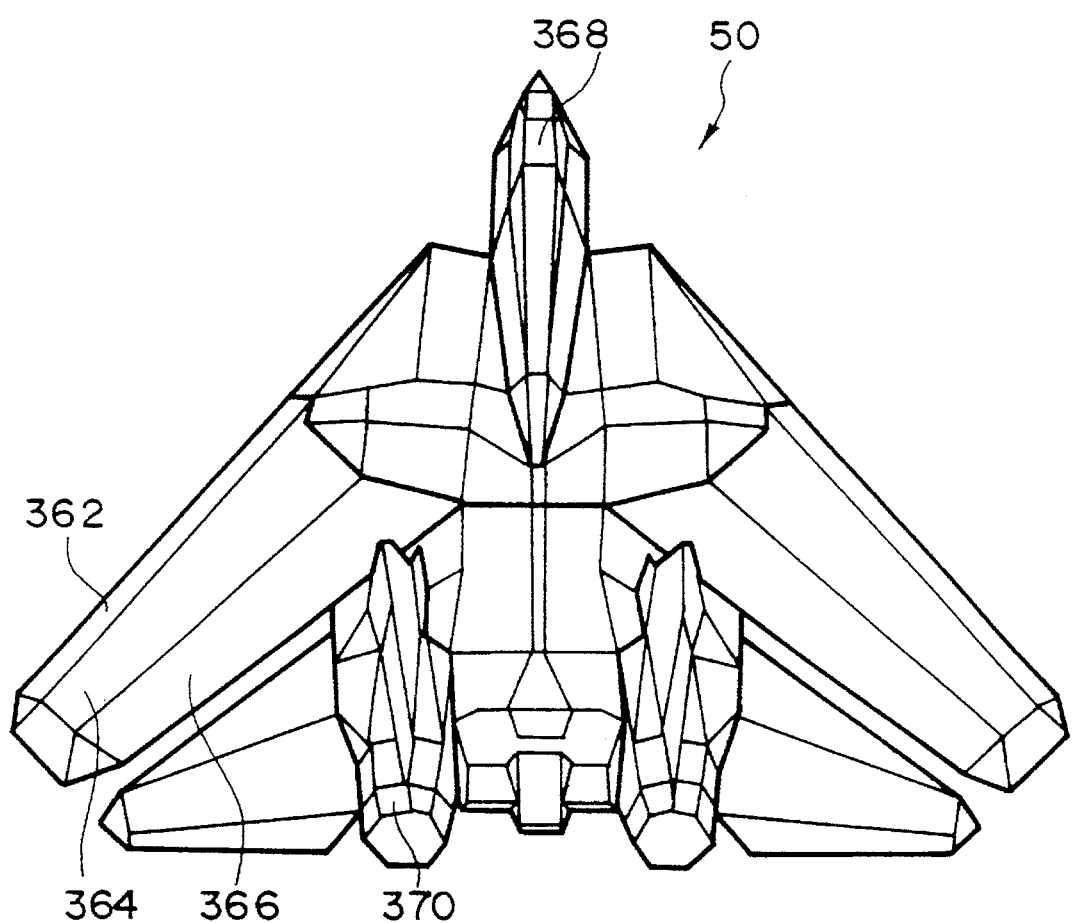
FIG. 5 is a schematic view of an example of a 3D object formed of a plurality of polygons.

Position information and direction information for each vehicle object such as an enemy fighter and an object number of the object such as an enemy fighter that is to be displayed at that position is stored in the vehicle information storage unit 108 (this stored position and direction information and the object number is hereinafter called "vehicle information"). A map formed from elements such as a ground surface, mountains, enemy base, and river is segmented into squares, and position information of this segmented map and an object number of each element such as a ground surface or mountain that is to be displayed at that position is stored in the map information storage unit 110 (this stored position information and the object number is hereinafter called "segmented map information"). Image information on the enemy fighter, ground surface, mountain, or enemy base specified by each of these object numbers is stored in the object image information storage unit 120. In this case, this image information is expressed as a plurality of polygons. For example, the enemy fighter 50 that is a vehicle object is expressed as polygons 362 to 370, etc., as shown in FIG. 5. Image information consisting of data such as vertex coordinates of each of these polygons 362 to 370 is stored in a vehicle image information storage unit 122 within the object image information storage unit 120. In a similar manner, map information on elements such as the enemy base 32 is expressed as a plurality of polygons, image information consisting of data such as vertex coordinates of these polygons is stored in a map image information storage unit 124.

On the basis of this vehicle information and segmented map information read out from the vehicle information storage unit 108 and the map information storage unit 110, the game space setting unit 104 reads corresponding image information from the object image information storage unit 120 and sets the game space. Details of the configuration and operation of the game space calculation unit 100 will be given later.

A pseudo-3D image as seen from any arbitrary viewpoint of the player 302 in the virtual 3D space, in other words, the pseudo-3D image projected by the CRT 10 in FIG. 2, is synthesized by the image synthesizing unit 200. In order to do this, the image synthesizing unit 200 is configured to comprise an image supply unit 212 and an image rendering unit 240.

The image supply unit 212 comprises a processing unit 214 that controls the entire image synthesizing unit 200, a coordinate transformation unit 216, a clipping processing unit 218, a perspective projection conversion unit 220, and a sorting processing unit 222. These units 216, 218, 220 and 222 perform 3D calculation processing on image information such as the vertex coordinates of polygons. The image rendering unit 240 formes an image of the polygons with all dots (pixels) within the polygons, from the image information such as vertex coordinates of polygons that has been subjected to 3D calculation processing by the image supply unit 212. The thus-rendered image is output by the CRT 10.

The operation of the entire 3D games machine will now be briefly described.

First, as the game starts, the processing unit 102 starts to control the game space setting unit 104 in accordance with the game program. The game space setting unit 104 reads from the vehicle information storage unit 108 and the map information storage unit 110 the vehicle information and segmented map information that was written therein by the game program, in accordance with this control. Image information on objects corresponding to the object numbers in this vehicle information and segmented map information is read from the object image information storage unit 120. Data that include the read-out image information together with the position and direction information within the vehicle information and segmented map information are then output to the image synthesizing unit 200 by the game space setting unit 104.

Data of a predetermined format are formed by the processing unit 214 of the image synthesizing unit 200 from data transferred from the game space setting unit 104.

Figure 6A:
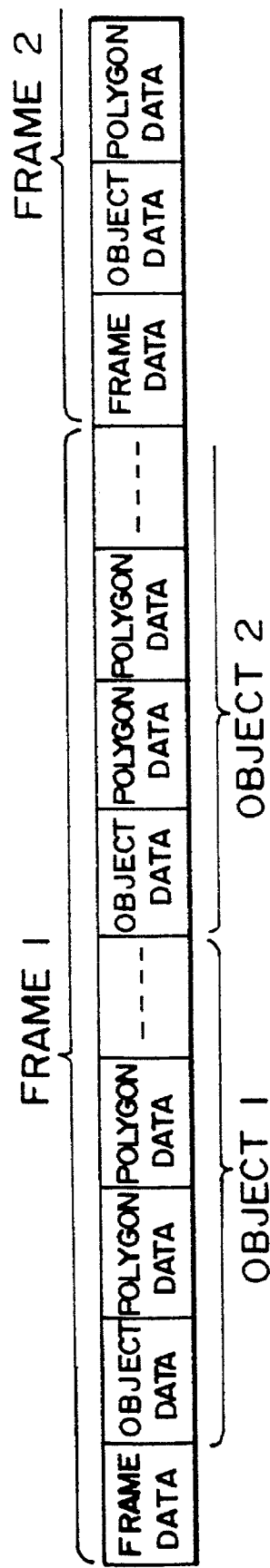
FIGS. 6A and 6B show an example of the data format handled by this 3D games machine.

The overall format of this data is shown in FIG. 6A. As shown in this figure, the data to be processed is configured such that frame data at the head thereof links together with object data on all the 3D objects to be displayed in that frame. After the object data comes a string of polygon data for polygons that form these 3D objects.

In this document, "frame data" mean data which are formed according to parameters that change in each frame, and which are configured of data that are common to all the 3D objects within one frame, such as the player's viewpoint position, direction of view, and view angle information, monitor angle and size information, and light-source information. These data are set for each frame.

"Object data" mean data which are formed according to parameters that change for each 3D object, and which are configured of data such as position information and direction information for individual 3D objects.

Figure 6B:
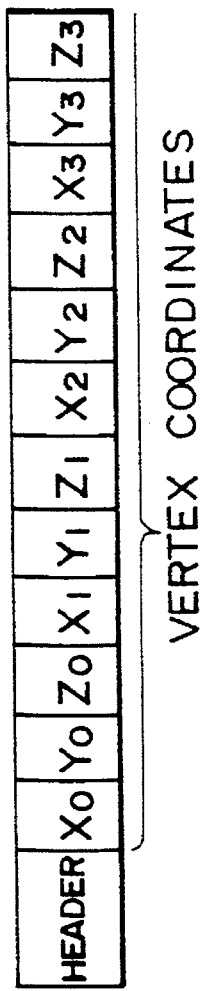

"Polygon data" mean data which are formed according to parameters such as polygon image information, and which are configured of a header, vertex coordinates X0, Y0, Z0 to X3, Y3, Z3, and other auxiliary data, as shown in FIG. 6B.

The coordinate transformation unit 216 reads out data in the above format and performs various types of calculation processing on these vertex coordinates. This calculation processing will now be described with reference to FIG. 7.

Figure 7:
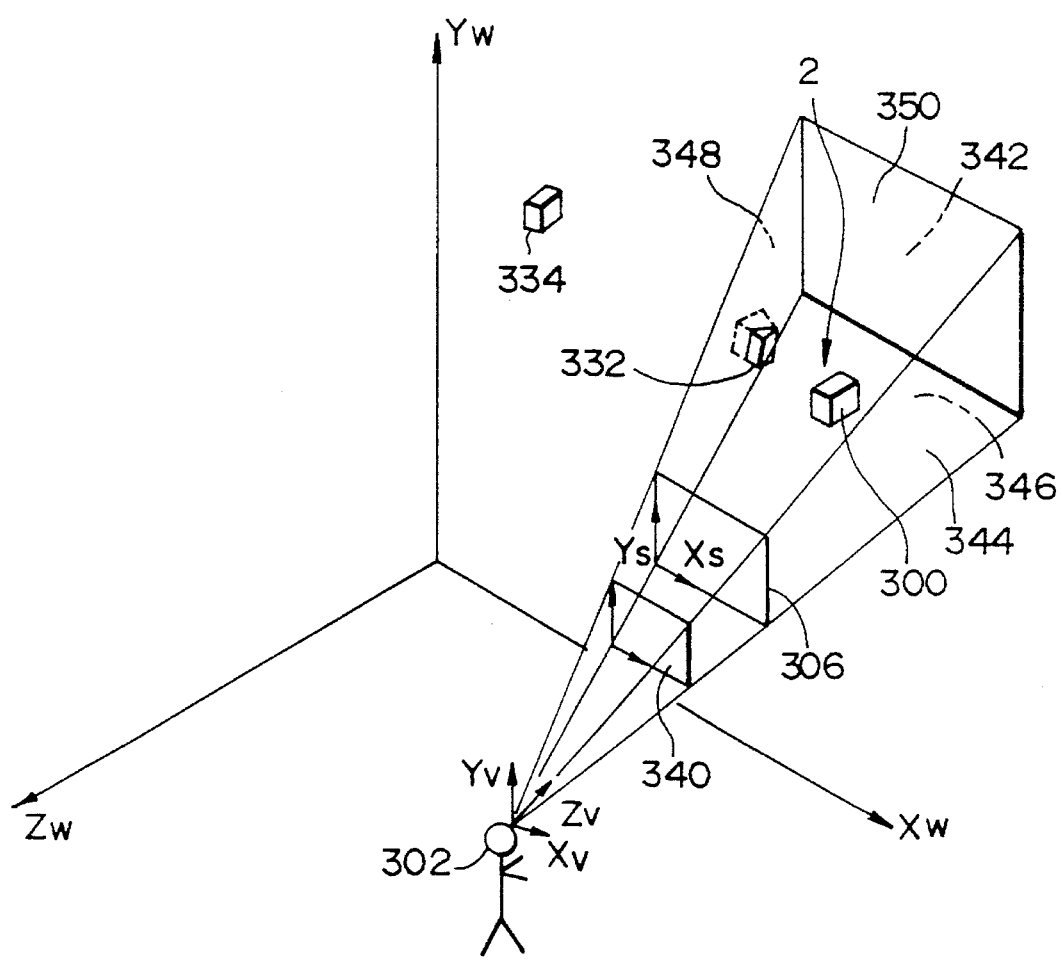
FIG. 7 is a schematic view illustrative of the 3D image calculation performed by the image synthesizing unit.

Taking as an example the above fighter aircraft game, 3D objects 300, 332, and 334 that represent the player's own fighter, an enemy fighter, buildings, and other obstacles are placed in a virtual 3D space expressed in a world coordinate system (XW, YW, ZW), as shown in FIG. 7. Subsequently, the image information that expresses these 3D objects is subjected to coordinate transformation into a viewpoint coordinate system (Xv, Yv, Zv) based on the viewpoint of the player 302.

The clipping processing unit 218 then performs a form of image processing that is called clipping processing. In this case, "clipping processing" means image processing that excludes image information that lies outside the visual field of the player 302 (or outside of viewing pyramid opening into a 3D space), in other words, outside a region bounded by front, back, right, bottom, left, and top clipping surfaces 340, 342, 344, 346, 348, and 350 (hereinafter referred to as a display region 2). This means that image information that has to be processed subsequently by this apparatus is limited to the image information within the visual field of the player 302. If unwanted information is previously removed by the clipping processing in this manner, the load on subsequent processing steps can be greatly reduced.

Next, the perspective projection conversion unit 220 performs perspective projection conversion to a screen coordinate system (XS, YS), but only on objects within the display region 2, and these data are output to the sorting processing unit 222.

The sorting Processing unit 222 determines the sequence of processing for the image rendering unit 240 in the next stage, and polygon image information is output according to that sequence.

In the image rendering unit 240, image information on all the dots within the polygons is calculated from data such as polygon vertex coordinates obtained by the 3D calculation processing of the image supply unit 212. The calculation method used in this case could be a method that obtains a peripheral outline of each polygon from the polygon vertex coordinates, obtains a pair of outline points that are at intersections between this peripheral outline and a scan line, and then provides a line formed between this pair of outline points with data such as predetermined color data. A method could be used in which image information on all the dots within each polygon is previously stored as texture information in means such as read-only memory (ROM), texture coordinates assigned to each vertex of the polygons are used as addresses, and this data is read out and mapped. Note that the applicants have already proposed details of image synthesis techniques for this sort of texture mapping, in Japanese Patent Application No. Hei 4-252139.

Finally, these pseudo-3D images formed by the image rendering unit 240 are output from the CRT 10.

3. Detailed Description of Calculation Processing Performed in Game Space Calculation Unit The calculation processing performed by the game space calculation unit 100 will now be described in detail.

The map information storage unit 110 of this embodiment is configured to comprise first, second, and third map information storage units 112, 114, and 116, as shown in FIG. 1. Segmented map information is stored in each of the first, second, and third map information storage units 112, 114, and 116.

Figure 8:
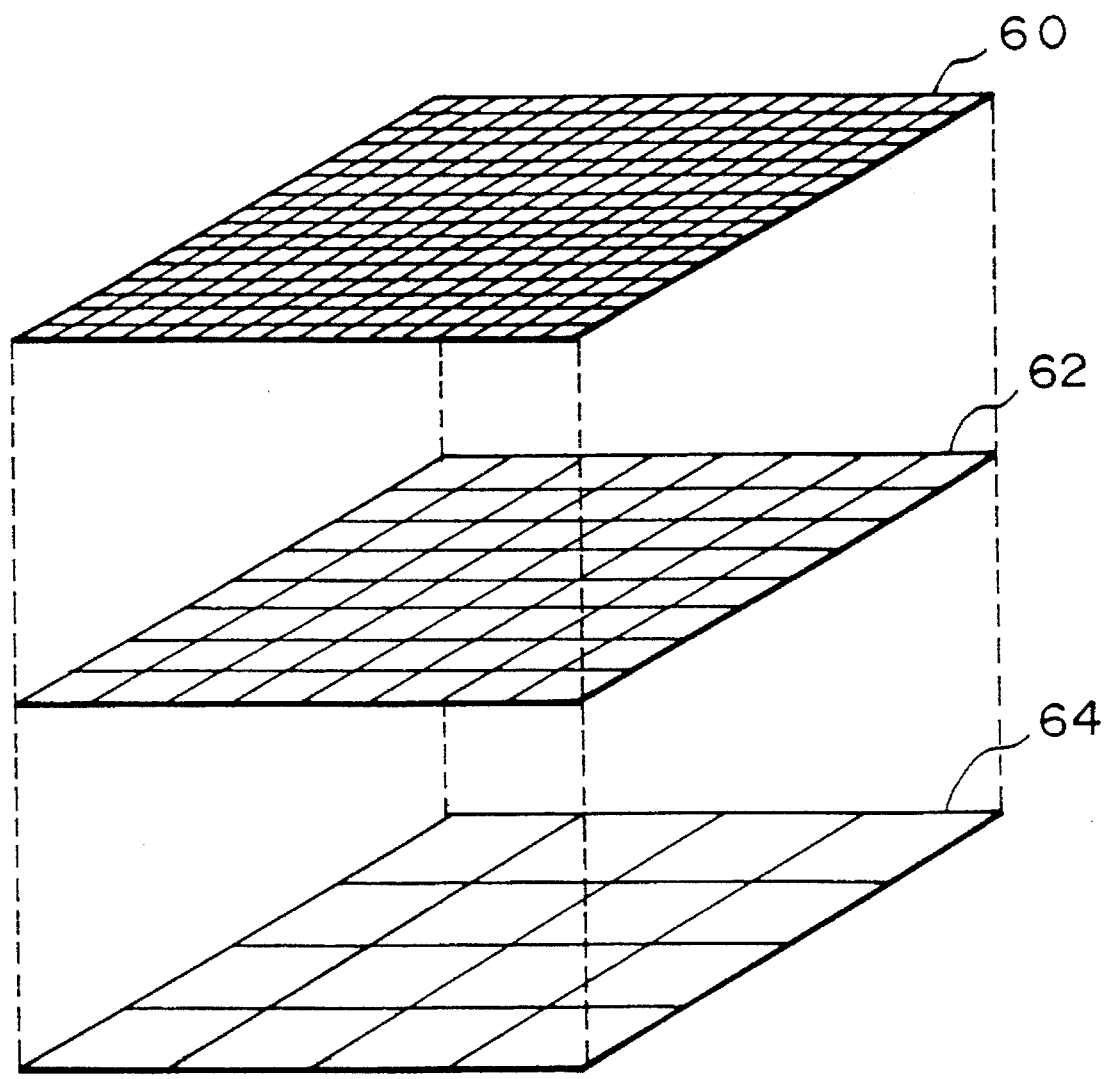
FIG. 8 is a schematic view illustrative of segmented map information.

Square segment patterns 60, 62, and 64 of segmented map information stored in the first, second, and third map information storage units 112, 114, and 116 are schematically shown in FIG. 8. As shown in this figure, the coarseness (number of segments) of each of the first, second, and third square segment patterns 60, 62, and 64 differs such that the first square segment pattern 60 is divided into squares that are at the finest pitch, the second square segment pattern 62 is divided into squares of an intermediate pitch, and the third square segment pattern 64 is divided into squares of the coarsest pitch. In this embodiment, a plurality of types of calculation processing is performed with respect to a map that contains the same elements, such as mountains, ground surface, and an enemy base, based on the segmented map information with different numbers of segments. By performing the calculation processing in this manner, a map that contains the same elements, such as mountains, ground surface, and an enemy base, can be rendered as images of different resolution. For example, map information on the same mountain 40a, 40b, and 40c is divided into 16 segments for storage in the first map information storage unit 112, into four segments for storage in the second map information storage unit 114, and is stored complete without being segmented in the third map information storage unit 116, as shown in FIG. 9.

In this embodiment, the object itself placed at a segmented map position can be made to have different shapes, as shown in FIG. 9.

Prior example, FIG. 9 shows that the mountain 40a is formed of objects H1 to H4, I1 to I4, J1 to J2, K1 to K2, and L1 to L4; the mountain 40b is formed of objects M1, M2, N1, and N2, and the mountain 40c is formed of a single object P1. In other words, it is clear from this figure that the mountain 40a is formed of detailed objects at a high resolution, while the mountain 40c is formed of a larger object in a simplified manner.

Note that the objects indicated by H2 to H4 are the same as object H1; they are simply the object H1 rotated and repositioned. In a similar manner, objects I2 to I4 are object I1, J2 is J1, K2 is K1, L2 to L4 are L1, M2 is M1, and N2 is N1—all simply rotated and repositioned. In the above described embodiment, a more detailed, higher resolution image can be implemented by keeping at least object image information in common. Thus a detailed image can be implemented while reducing the amount of data to be processed, so that the present invention can provide a high-quality image in real time. The mountain 40a, for example, is rendered as an image with seven surfaces. In contrast thereto, each of the objects H1 to H4, I1 to I4, and so on is formed of surfaces having three or fewer faces (polygons). Therefore, in accordance with this embodiment, detailed objects having more surfaces can be implemented of objects formed of few surfaces.

Thus this embodiment ensures that the same mountain can be displayed at completely different resolutions and renderings, by varying the coarseness (number of segments) of the square segment patterns, as shown in FIG. 9.

An example of the data format of the first, second, and third segmented map information when it is stored in the first, second, and third map information storage units 112, 114, and 116 is shown in FIG. 10. As shown in the figure, this segmented map information is configured of a map address for determining which segmented map information is selected, position information for determining the position of the segmented map, and an object number for specifying the object to be displayed at that position. This figure shows that the first, second, and third segmented map information consists of k, l, and m data items, respectively. These numbers k, l, and m correspond to the numbers of segments in the corresponding segmented map information, and are in a relationship such that: k>l>m. Note that there are no Y coordinates in the position information because the map in this embodiment is flat. This means that, if a 3D map is used as the map, this positional data will include Y coordinates, as will be described later. In this embodiment, objects are specified by object numbers. This ensures that, since maps of mountains and ground surfaces of the same shapes are formed continuously in an ordinary game, the quantity of image information stored in the object image information storage unit 120 can be reduced by making these shapes common.

The object image information storage unit 120 is configured to comprise the vehicle image information storage unit 122 and the map image information storage unit 124. Image information on vehicle objects that move in the game space is stored in the vehicle image information storage unit 122. This image information is represented as a plurality of polygons, such as the polygons 362 to 370, etc., shown in FIG. 5, and is formed of vertex coordinates and auxiliary data for these polygons. In a similar manner, image information on elements such as the enemy base 32, mountain 40, ground surface 42, and river 44 shown in FIG. 3A to FIG. 3C are stored in the map image information storage unit 124. This image information is also represented as a plurality of polygons, and is also formed of vertex coordinates and auxiliary data for these polygons.

The game space setting unit 104 comprises a map segment pattern setting unit 106 that sets a map segment pattern in accordance with instructions from the processing unit 102 and the player's operating signals that are input from the control unit 140. Vehicle information and segmented map information is read out from the vehicle information storage unit 108 and the map information storage unit 110 in accordance with the thus-set map segment pattern. The game space setting unit 104 reads out image information from the object image information storage unit 120 on the basis of the object numbers in the read-out vehicle information and segmented map information. The position information and direction information in the vehicle information and segmented map information is added to this image information and these data are output to the image synthesizing unit 200 to set the game space. Note that the direction information is not always necessary when object images are all oriented in the same direction.

When it comes to setting up the game space by this embodiment as described above, calculation processing is done according to the following method to ensure that a high-quality image is synthesized in real time:

(1) The further away that objects are from the player's own aircraft, the more the corresponding map image information is simplified. Only data that are within the player's visual field range are output to the image synthesizing unit 200.

(2) As far as possible, data on objects close to the player's own aircraft have priority in the output to the image synthesizing unit 200.

(3) Map image information that does not require clipping processing is previously identified, and the image synthesizing unit 200 is informed that this image information is not to be subjected to clipping processing.

This calculation method will now be described with reference to FIG. 11 to FIG. 14.

Figure 11:
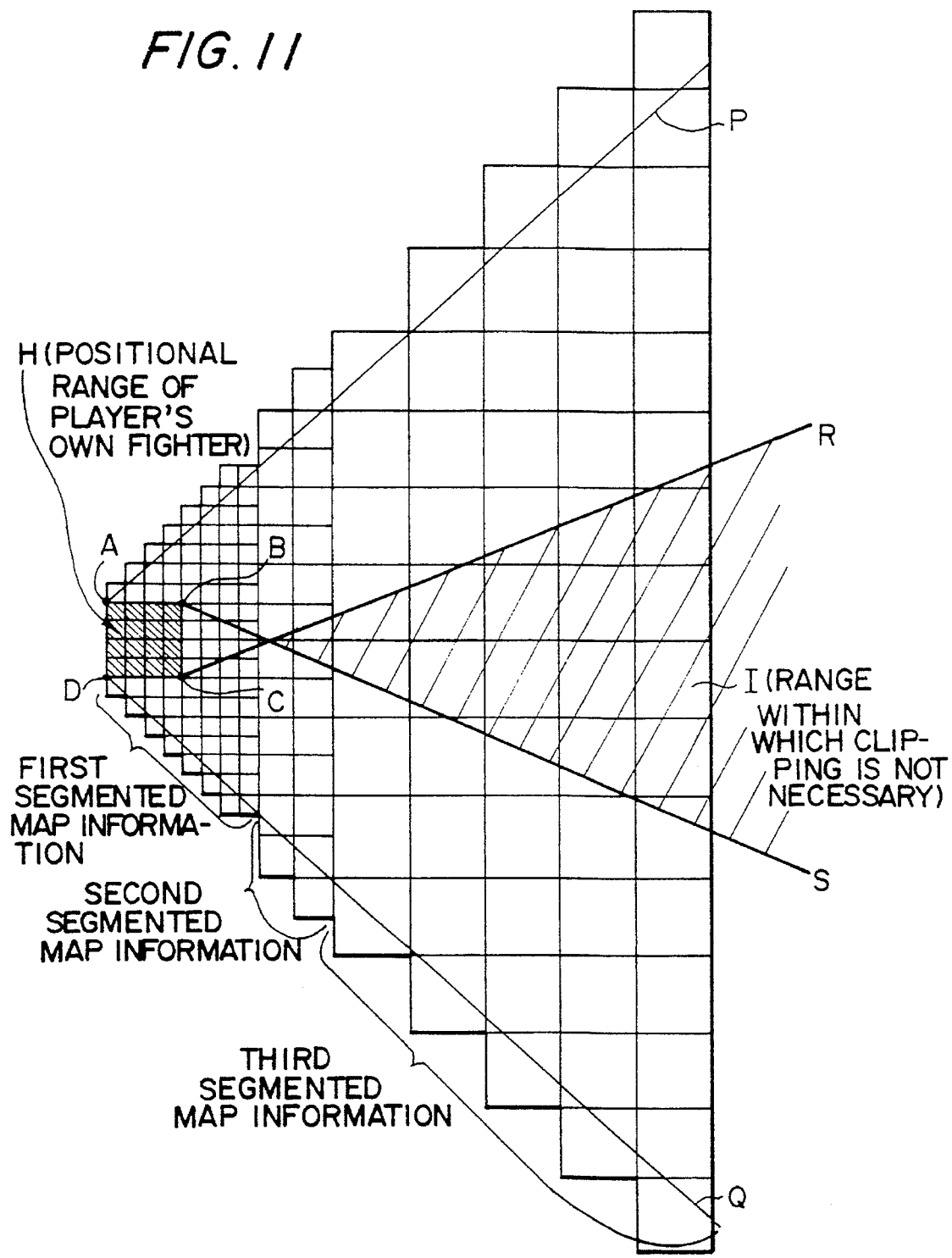
FIG. 11 shows an example of a map segment pattern.
Figure 12:
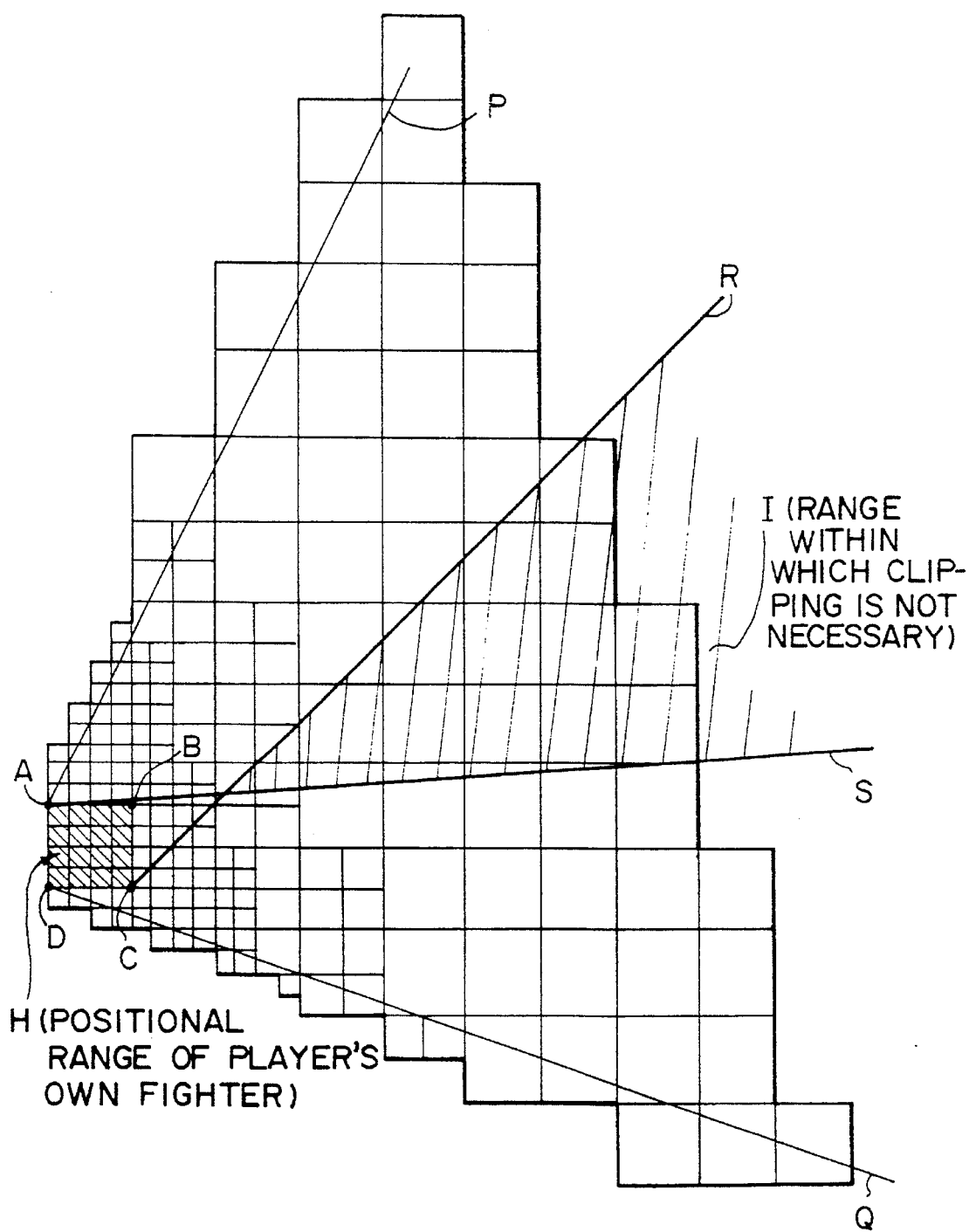
FIG. 12 shows another example of a map segment pattern.
Figure 13:
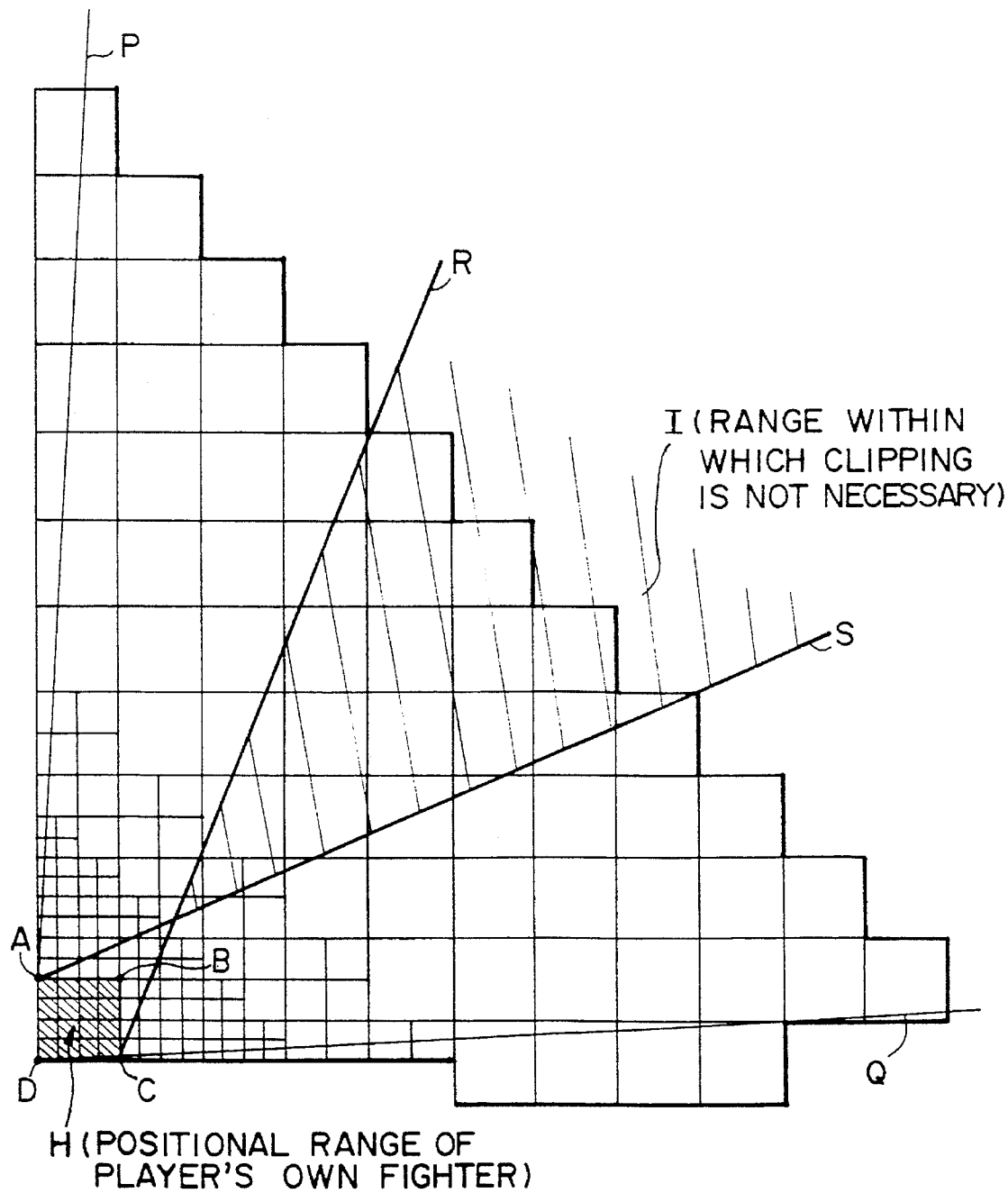
FIG. 13 shows a further example of a map segment pattern.

Examples of the map segment patterns set by the map segment pattern setting unit 106 are shown in FIG. 11 to FIG. 13. These map segment patterns could be previously stored in the map segment pattern setting unit 106, or they could be obtained as required by a predetermined calculation method. The selection of one of the map segment patterns shown in FIG. 11 to FIG. 13 is determined by the position of the fighter piloted by the player and the player's line-of-sight direction (e.g., the direction in which the player's fighter is flying). For example, the map segment pattern shown in FIG. 11 is selected when the player's fighter is positioned within a shaded range H, and the player's line-of-sight direction is between −11.25 degrees and 11.25 degrees. Note that the player's visual field angle is set to be 60° in this embodiment.

The map segment pattern of FIG. 11 is formed as described below. First, a line P in this figure indicates a left-edge boundary as seen from the player, when the fighter piloted by the player is positioned at a point A and the player's line-of-sight direction is at 11.25° (visual field angle of 60°). More specifically, this line P is at an angle of (30+11.25)=41.25° with respect to a forward direction starting from the point A. Similarly, a line Q indicates a right-edge boundary as seen from the player, when the fighter piloted by the player is positioned at a point D and the player's line-of-sight direction is at −11.25°. More specifically, it is at an angle of (−30−11.25)=−41.25° with respect to a forward direction starting from the point D. The map segment pattern shown in FIG. 11 is such that first, second, and third segmented map information is set to be positioned within a range bounded by the lines P and Q (note, however, that segmented map information in contact with the lines P and Q should also be included for accuracy). With a map segment pattern set in this fashion, it is not necessary to subject segmented map information left of the line P and right of the line Q to calculation processing in the image synthesizing unit 200. In other words., since the player cannot see to the left of the line P or to the right of the line Q, there is no need to subject that segmented map information to calculation processing. This enables a huge reduction in the amount of data to be processed, making it possible to provide a high-quality image display in real time.

In the map segment pattern shown in FIG. 11, the first, second, and third segmented map information is placed in sequence starting from close to the fighter piloted by the player. This first, second, and third segmented map information is rendered in such a manner that the first segmented map information is the most detailed and the second and third segmented map information is sequentially simplified, as shown in FIG. 8 and FIG. 9. With a map segment pattern set in this fashion, an object that is far distant from the player's fighter, such as the enemy base 32 in FIG. 3A, can be rendered in a simplified form and thus the amount of data to be processed can be greatly reduced. Since the same enemy base 32 is rendered in far more detail when it is closer to the player's fighter, as shown in FIG. 3C, the player can be provided with an extremely high-quality image. If all objects are always rendered through the segmented map information of the same level, same serious problems such as skip of images or failure of displaying objects to be displayed can occur in FIG. 3A. Moreover, it becomes difficult in practice to accurately render objects such the AA gun mount 36 and people 38 on top of the enemy base 32 in FIG. 3C, and so the realism of the game cannot be increased further.

In this embodiment, it is possible to specify that the image synthesizing unit 200 does not perform clipping processing on segmented map information in a range I bounded by lines R and S. In this case, the line R indicates a left-edge boundary as seen from the player, when the fighter piloted by the player is positioned at a point C and the player's line-of-sight direction is at −11.25° (visual field angle of 60°). Similarly, the line S indicates a right-edge boundary as seen from the player, when the fighter piloted by the player is positioned at a point B and the player's line-of-sight direction is at 11.25°. This range I bounded by lines R and S is a range that should be always displayed when the position of the player's fighter is within the range H. Therefore, it is possible to specify that this range I is a region in which clipping is not required. Thus this embodiment specifies to the image synthesizing unit 200 that clipping processing is not to be performed on the data in this range I, which is intended to greatly reduce the amount of data to be processed. Since clipping processing is the most time-consuming part of the work done by the image synthesizing unit 200, this reduction in the amount of data to be processed is particularly effective in increasing the immediacy of the image processing.

This map segment pattern shown in FIG. 12 is that selected when the player's fighter is in the range H and the line-of-sight direction is within the range of 11.25° to 33.75°. In a similar manner, the map segment pattern shown in FIG. 13 is that selected when the line-of-sight direction is within the range of 33.75° to 56.25°. In this embodiment, three map segment patterns are provided as described above, and map segment patterns for other regions are generated by subjecting one of these three map segment patterns to coordinate transformation. An entire set of 16 patterns could be previously provided. The number of map segment patterns could also be increased, or could be decreased.

Figure 14:
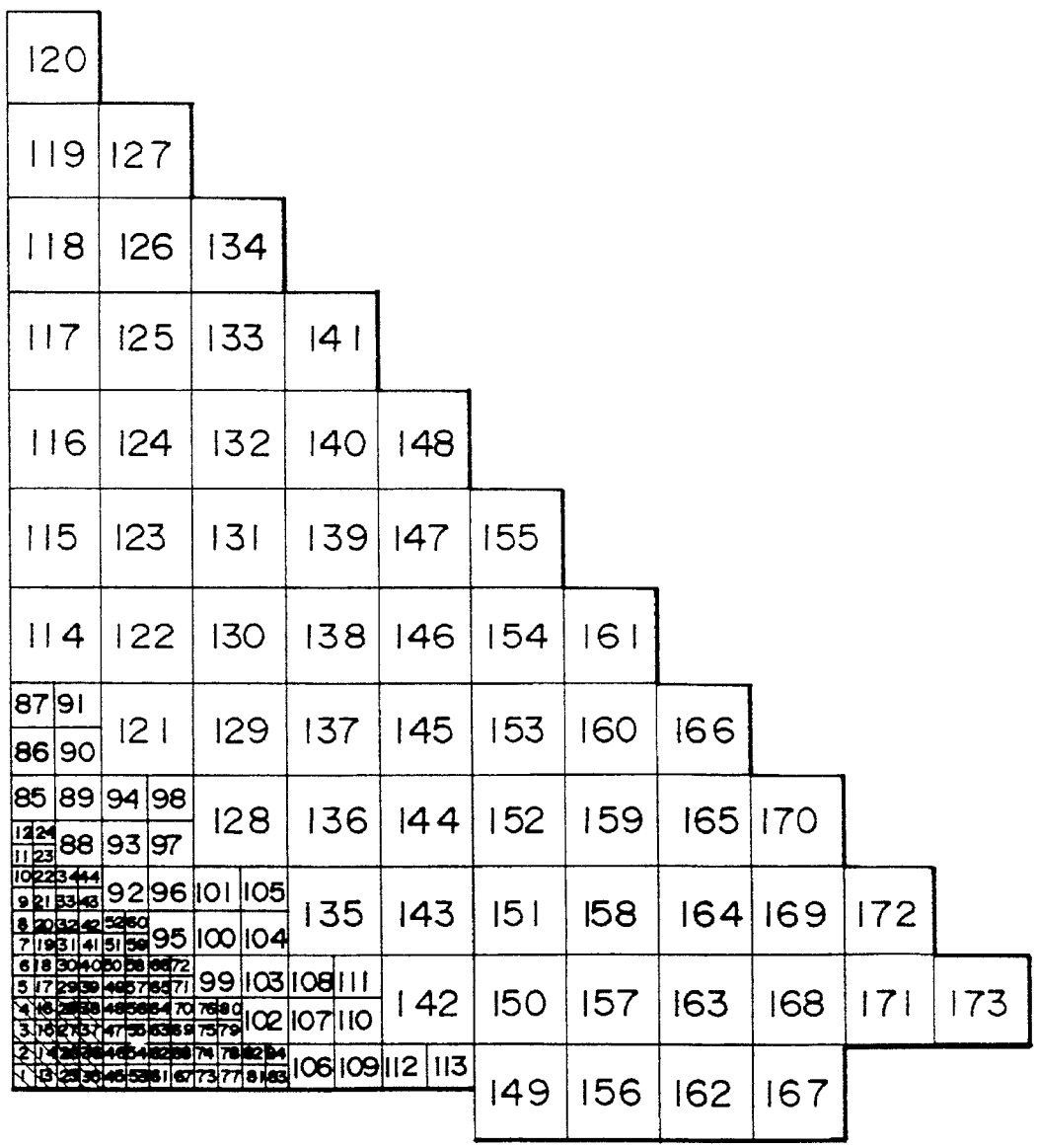
FIG. 14 is a schematic view used to illustrate the output sequence of data for the map segment pattern of FIG. 13.

An example of the sequence in which data are output to the image synthesizing unit 200 for the map segment pattern of FIG. 13 is shown in FIG. 14. As shown in this figure, the first data output to the image synthesizing unit 200 is that for positions as close as possible to the player's fighter. The outputting of data in this sequence ensures that there are no drop-outs in the data for regions close to the player's fighter as shown in FIG. 14, even if, for example, data drops out because the image synthesizing unit 200 does not have time to complete all the image processing. Since this data has been simplified as described above, drop-outs in such data will not seriously affect the view as seen by the player. Therefore, a high level of quality can be expected of images rendered by this 3D games machine. Note that, the data output sequence in FIG. 14 is determined first of all in the first segmented map information, then in the second and then third segmented map information in order, by changing the X coordinates. Determining the output sequence in this order extremely simplify the processing. However, it should also be noted that this invention is not limited thereto; the output sequence can be determined by any of various methods without departing from the scope of the present invention. For example, a method could be used in which the distance from the player's fighter to a segmented map could be calculated as required, and data are output in sequence starting with data in which this distance is the shortest.

The above description is concerned to an arrangement in which a predetermined map segment pattern is provided in the map segment pattern setting unit 106, and this is used to set the game space. However, the present invention is not limited thereto. A map segment pattern can be calculated while the game is in progress, and the thus-calculated map segment pattern can be used to set the game space. The acquisition of a map segment pattern by calculation while the game is in progress is described below.

Figure 15:
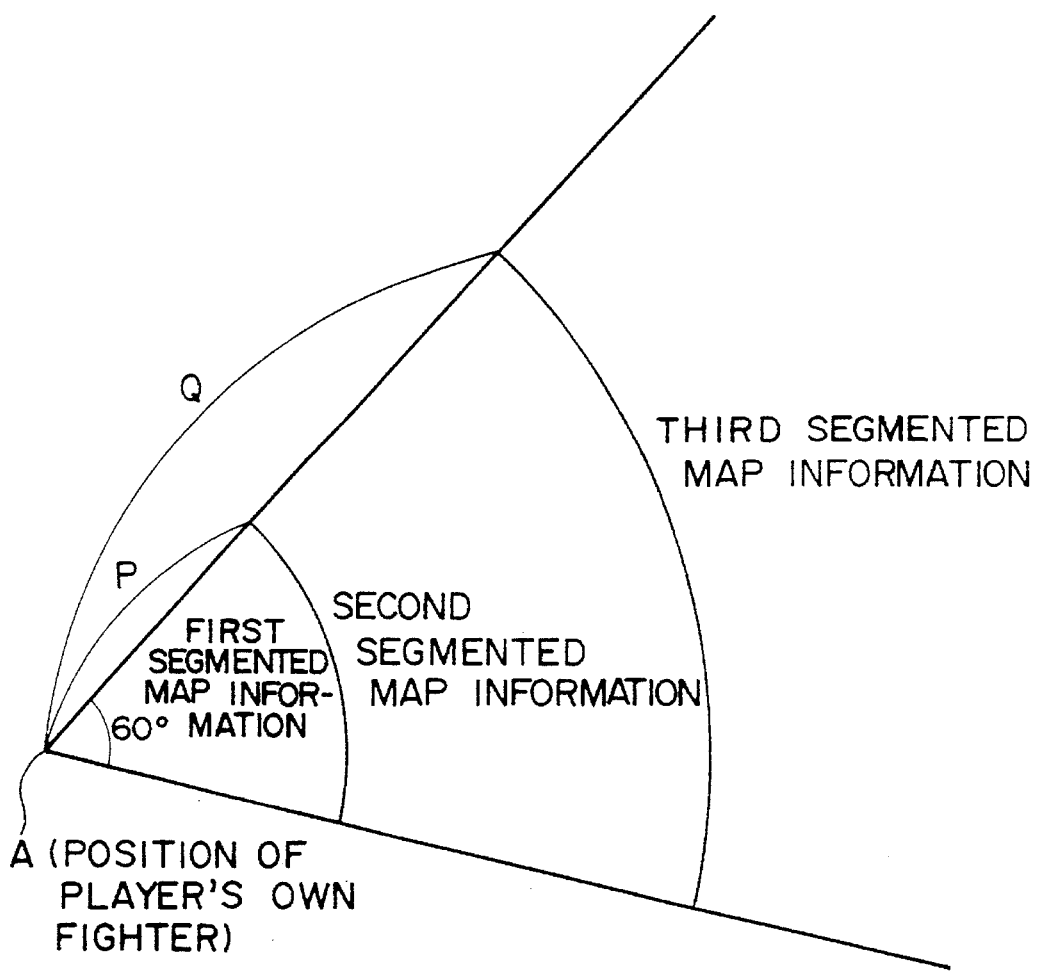
FIG. 15 is a schematic view used to illustrate how map segment patterns are obtained by calculations.

First, the position of the player's own fighter and the player's line-of-sight direction while the game is in progress are determined according to operating signals from the control unit 140 and instructions from the processing unit 102. The map segment pattern setting unit 106 forms a map segment pattern as shown in FIG. 15 on the basis of the position of the player's fighter and the player's line-of-sight direction. This map segment pattern has a fan shape centered on the position A of the player's fighter in the line-of-sight direction and with a central angle of 60°, that is a visual field angle. The map segment pattern setting unit 106 then reads a sequence of segmented map information from the map information storage unit 110. The distance L between the player's fighter and that segmented map is obtained from position information (Xnk, Znk) in the read-out segmented map information. The segmented map information is sequentially filled into the fan-shaped map segment pattern of FIG. 15 on the basis of the thus-calculated distances. In this case, if a calculated distance L is such that O<L<P (where P is the distance to the boundary between the first and second segmented map information), segmented map information is read from the first map information storage unit 112. Similarly, if the distance L is such that P<L<Q (where Q is the distance to the boundary between the second and third segmented map information), segmented map information is read from the second map information storage unit 114. If the distance L is such that Q<L, the segmented map information is read from the third map information storage unit 116.

Each map segment pattern is obtained as required by the above calculation, then image information is read from the object image information storage unit 120 on the basis of the object number in the thus-input segmented map information. Data including position information in the segmented map information and this image information are formed and input to the image synthesizing unit 200.

With the embodiment as described above, each map segment pattern can be calculated as required while the game is in progress, and this can be used for setting the game space. Various methods could be used for calculating the map segment pattern in this case. For example, a map segment pattern need not be calculated for each frame; it could be done whenever the position of the player's fighter exceeds a previously determined positional range of the player's fighter. The use of such a calculation method means that the number of times map segment patterns are calculated can be reduced, and thus further increases in processing speed can be expected.

Figure 16A:
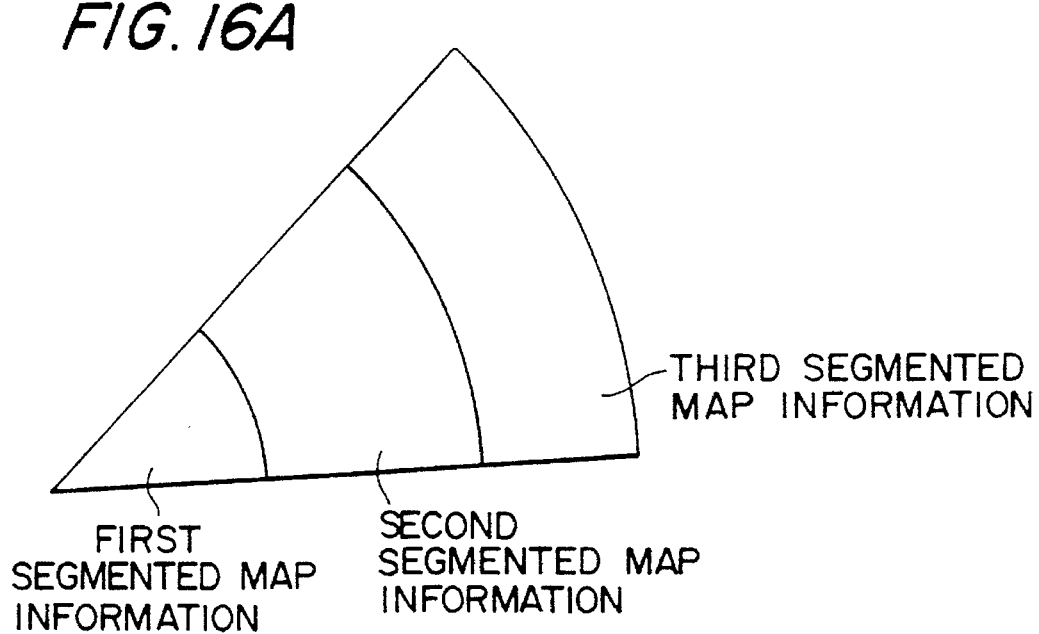
FIG. 16A and FIG. 16B are schematic views used to illustrate how first, second, and third segmented map information is superimposed for display.
Figure 16B:
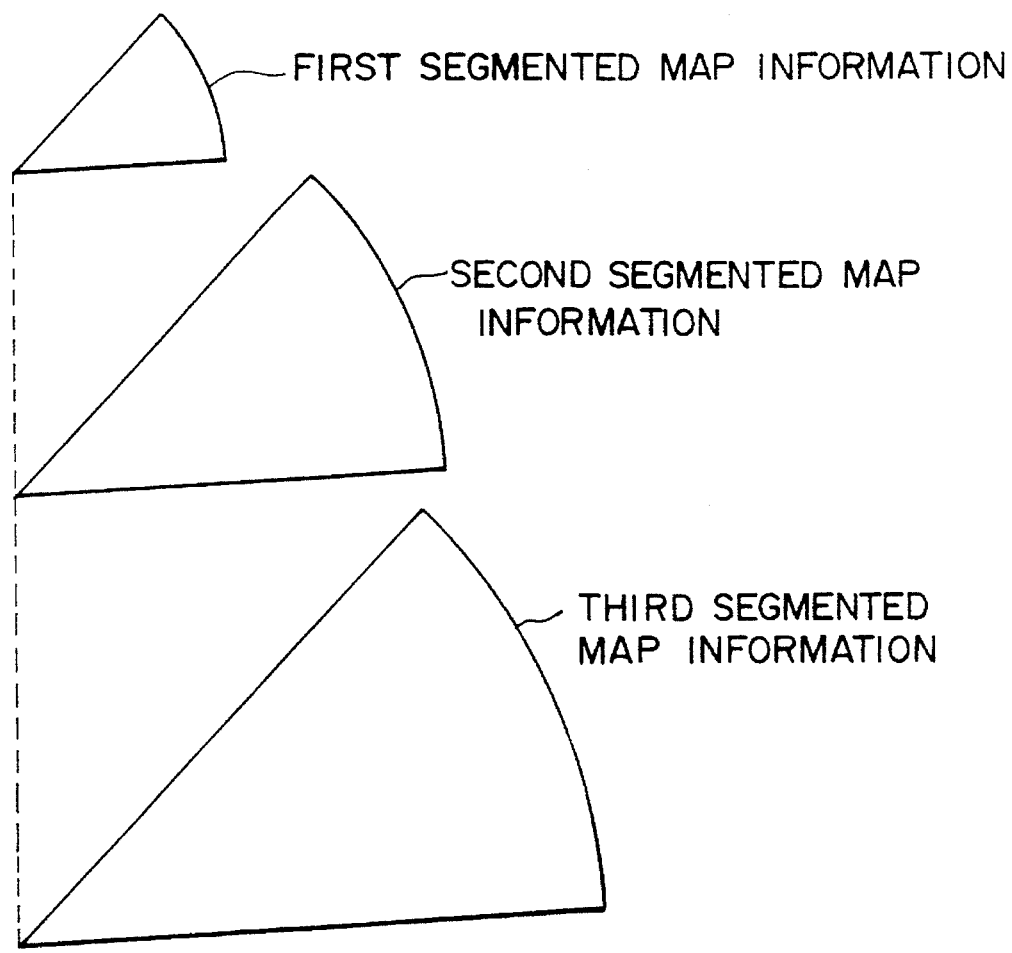

In the embodiment described above, the regions in which the first, second, and third segmented map information is provided are separated, and the setting of each of the first, second, and third segmented map information depends on the distance from the player's fighter. However, the setting of the first, second, and third segmented map information by this invention could be done by another method, such as that shown in, for example, FIG. 16A and FIG. 16B. In other words, the first, second, and third segmented map information is set as shown in FIG. 16B, and these groups of information are superimposed as shown in FIG. 16A. Object image information from which detailed portions of the object to be displayed are omitted is specified by the third segmented map information. On the other hand, object image information that adds these detailed portions is specified by the first and second segmented map information. The display image is formed by superimposing images read out in accordance with this segmented map information.

Taking FIG. 3C as an example, map information for the ground surface 42 is set as third segmented map information, map information for the enemy base 32 is set as second segmented map information, and details such as the windows 34, AA gun mount 36, and people 38 are set as first segmented map information. The pseudo-3D image shown in FIG. 3C can be obtained by superimposing the images read out in accordance with the first, second, and third segmented map information that has been set in this manner. Note that the windows 34, AA gun mount 36, and people 38 can be drawn to a higher resolution than the enemy base 32 in this case.

If a mountain is to be displayed in a similar manner, the slopes of the mountain could be set as third segmented map information, trees on the mountain slopes could be set as second segmented map information, and a hut on the mountain could be set as first segmented map information.

With the segmented map information set in this manner, the amount of data to be processed is reduced and also the quality of the image can be increased. In other words, the player perceives virtually no difference, even when maps of objects such as ground surfaces and mountains are positioned in several places on the display image but the resolution of these images is not particularly detailed. Therefore, maps of this sort are most suitably expressed as third segmented map information. In contrast, maps of details such AA gun mounts and huts are not positioned in several places on the display image, but it is necessary that these images have as detailed a resolution as possible. Therefore, maps of this sort are most suitably expressed as first segmented map information. Setting the maps in this fashion ensures that the player can be provided with a high-quality image in real time.

In this case, it is preferable that the radius of the segmented map pattern set by the first segmented map information is the shortest, and the radius of the segmented map pattern set by the third segmented map information is the largest, as shown in FIG. 16A. This is because the first segmented map information consists of the most detailed map information. Therefore, making the range that sets this first segmented map information to be as small as possible ensures that the amount of data to be processed is reduced. In addition, there is no need to set detailed image information for objects far from the position of the player's fighter.

Figure 17:
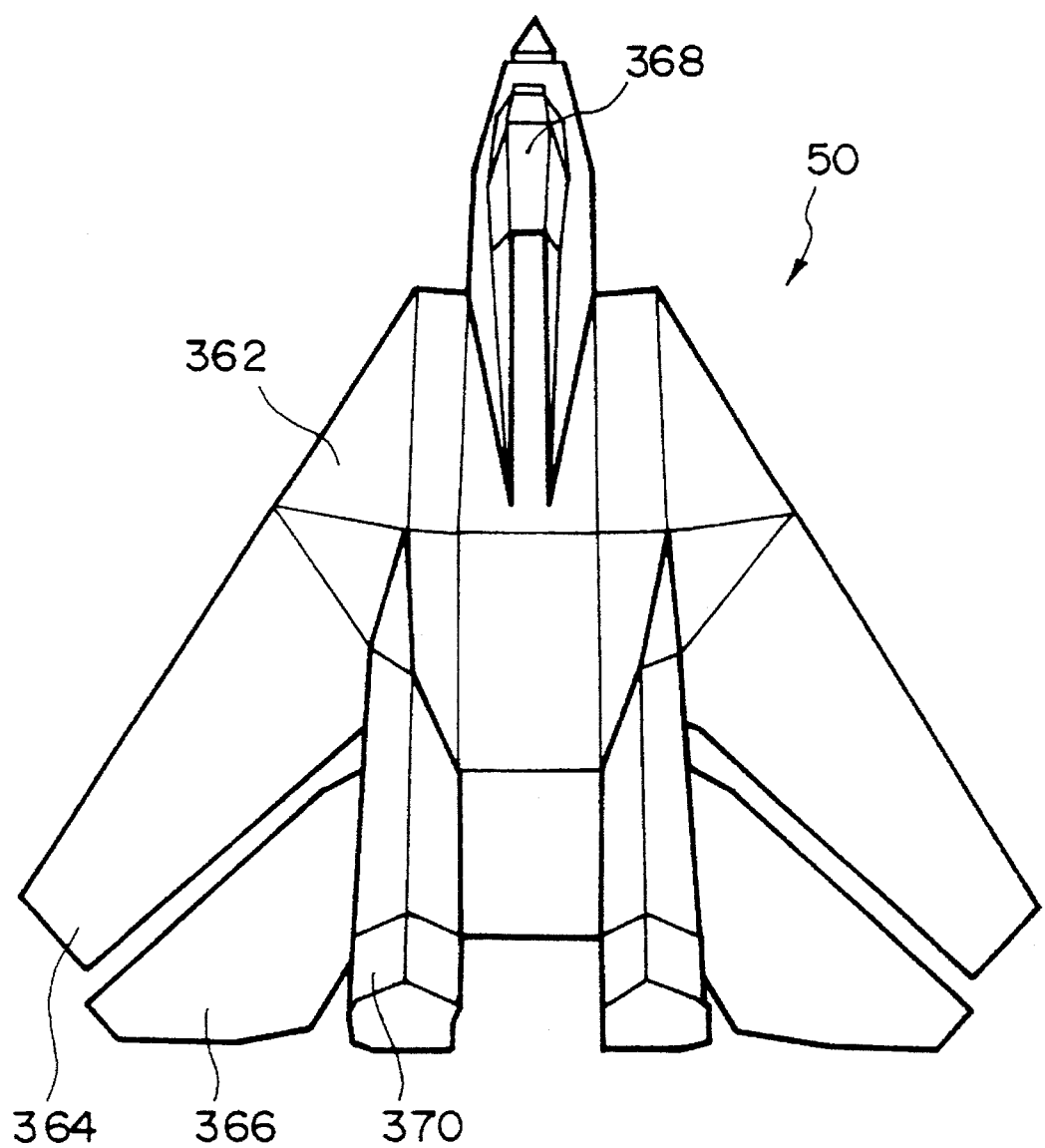
FIG. 17 is a schematic view of an example of a 3D object formed of a plurality of polygons.

The above description is concerned to a case in which map information is sequentially simplified with distance. However, it should be noted that this embodiment is not limited thereto. Image information for a vehicle object that appears in the games space, such as enemy fighter image information, could similarly be rendered in such a manner that it is sequentially simplified with distance from the player's own fighter. For example, a version of the enemy fighter 50 of FIG. 5 that is rendered in a simplified manner is shown in FIG. 17. The detailed enemy fighter image information of FIG. 5 and the simplified enemy fighter image information of FIG. 17 are both stored in the vehicle image information storage unit 122. The game space setting unit 104 obtains the distance L to the enemy fighter from the position information of the player's fighter and position information of the enemy fighter that is stored in the vehicle information storage unit 108. If this distance L is less than the previously determined distance P, the detailed enemy fighter image information shown in FIG. 5 is read out from the vehicle image information storage unit 122. Conversely, if the distance L is greater than or equal to P, the simplified enemy fighter image information shown in FIG. 17 is read out from the vehicle image information storage unit 122. The game space setting unit 104 adds position information to the thus-read enemy fighter image information, for output to the image synthesizing unit 200. Setting the game space in this fashion ensures that an enemy fighter that is rendered in more detail can be seen by the player as the player's own fighter approaches the enemy fighter 50 as shown in FIG. 4A and FIG. 4B. This makes it possible to see an enemy pilot 54 in the enemy fighter, for example, enabling an increase in the realism of the game. This method of simplifying enemy fighter image information with distance is particularly effective when several enemy fighters are appearing and disappearing on the screen.

Note that this invention is not limited to the above described embodiment; various modifications can be carried out within the scope of the present invention.

Figure 18:
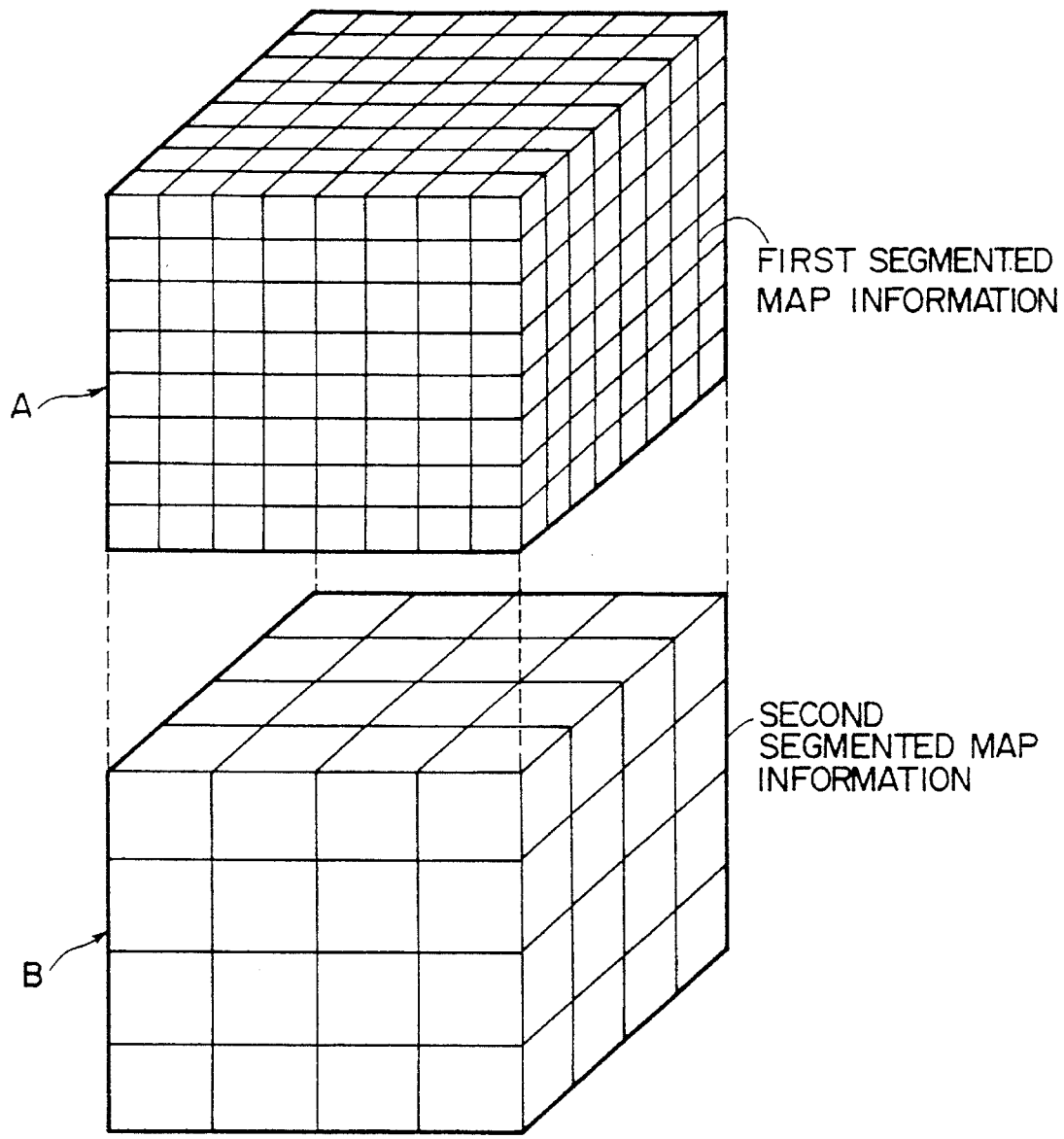
FIG. 18 is a schematic view of one method of dividing segmented map information, when a 3D map is used.
Figure 19:
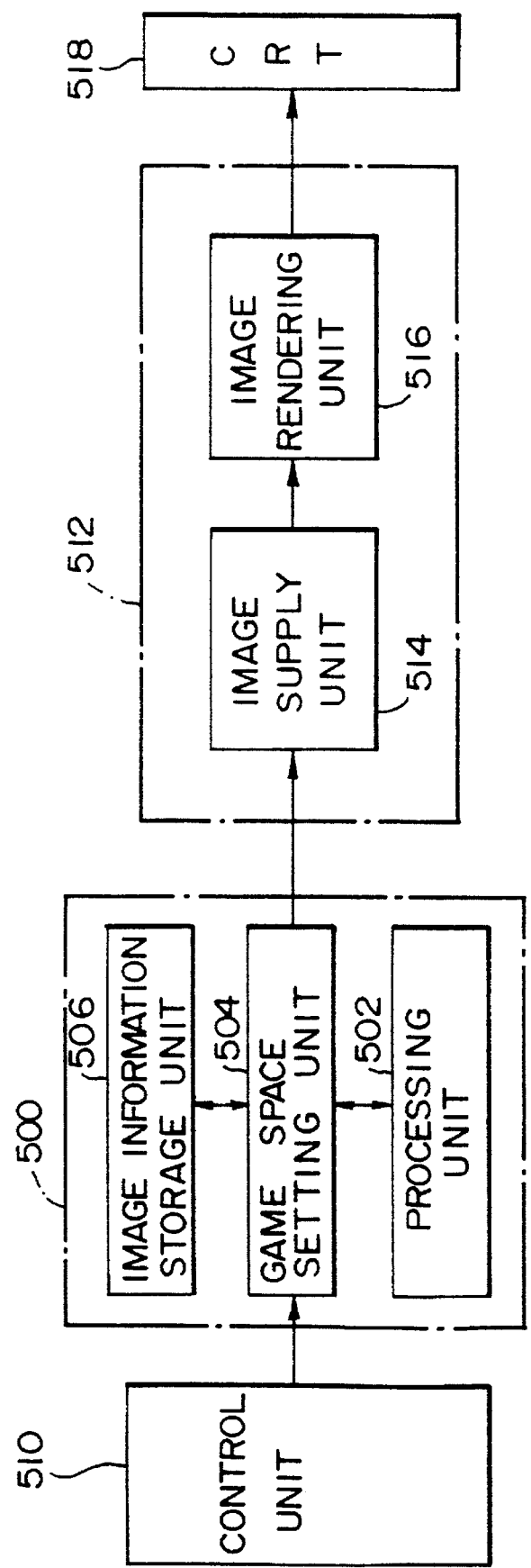
FIG. 19 is a block diagram of a 3D games machine of the prior art.
Figure 20A:
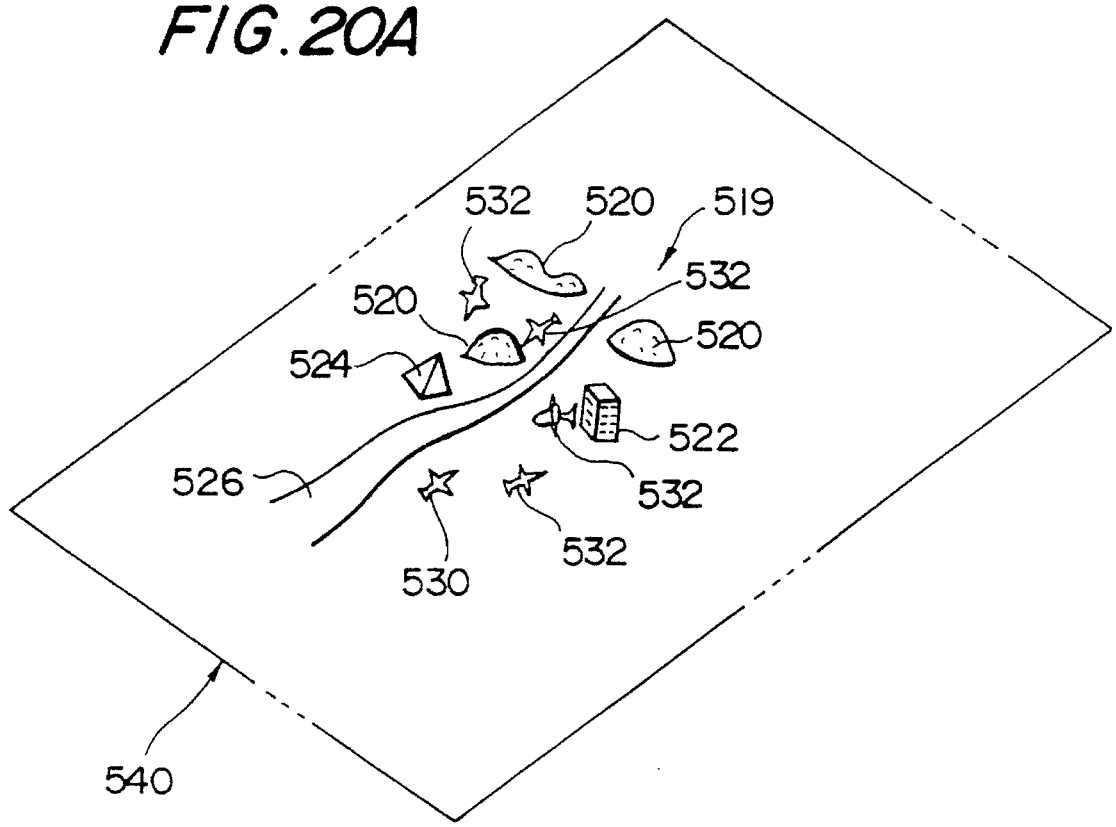
FIG. 20A and FIG. 20B are schematic views illustrative of a game space rendered by the prior-art 3D games machine.
Figure 20B:
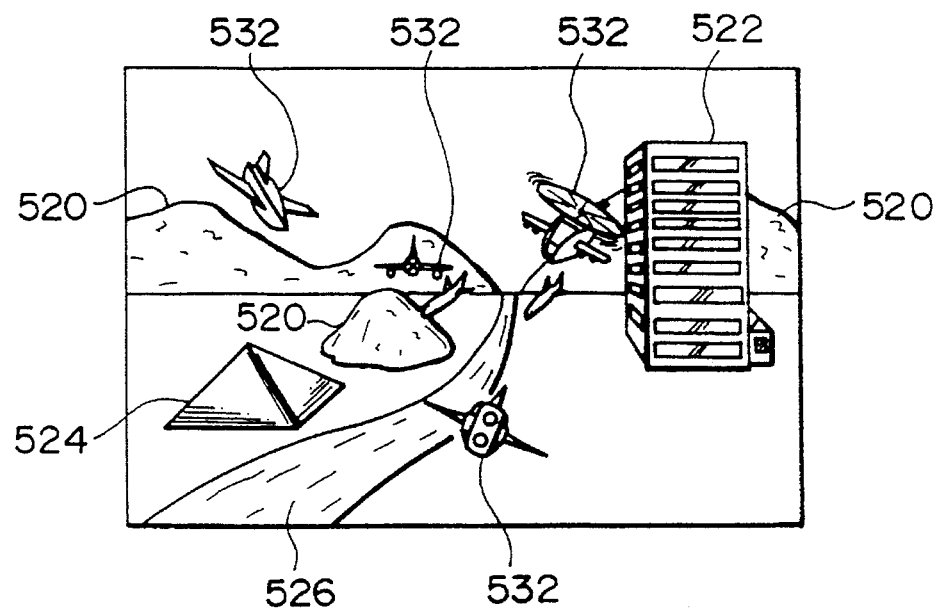

For example, the above description took as an example a map on two-dimensional plane such as the ground surface, mountains, river, and enemy base were rendered as the map that configures the game space of the above embodiment. However, this invention is not limited thereto; a map that is formed in a three-dimensional manner within a 3D space, for example, could equally well be used. A space-wars game in which the player destroys enemy spaceships while flying through space and dodging meteorites and other obstacles could be considered as a 3D game that would use such a map. In such a 3D game, the map could be of meteorites and planets placed around the player's own spaceship. In this case, the first segmented map information could be divided as shown in FIG. 18A and the second segmented map information could be divided as shown in FIG. 18B. By setting the game up in this fashion, not only can the realism of the game be increased by, for example, rendering the shape of a meteorite in more detail as it comes closer to the player's spaceship, but also the amount of data to be processed can be greatly reduced by simplifying the rendering of meteorites that are far therefrom. In a similar manner, a dramatic effect can be achieved by gradually making visible details on a planer's surface, such as seas and mountains, as the spaceship approaches the planet.

This invention is not only applicable to an arcade games machine; it can of course be applied to other types of games machine such as a domestic model (TV games machine).

The calculations performed by the game space calculation unit or the like could be processing performed by a dedicated image processing device, or it could be processing achieved by the use of means such as a microprocessor.

What is claimed is:

1. A 3D games machine which forms a game space such that a player is enabled to move in a predetermined vehicle within a virtual 3D space by operating an operating means, wherein said 3D games machine comprises:

a map information storage means in which at least position information and an object number of a segmented map formed by dividing a map of the game space into a predetermined number of segments are stored as segmented map information;

an object image information storage means in which object image information specified by said object number is stored; and a game space setting means for reading said segmented map information from said map information storage means and for setting a game space by reading out said object image information from said object image information storage means on the basis of the thus read-out segmented map information; and wherein:

said map information storage means stores a plurality of types of said segmented map information, of different numbers of segments, and said game space setting means reads out segmented map information with a smaller number of segments as the distance between said vehicle operated by said player and said segmented map increases.

2. A 3D games machine which forms a game space such that a player is enabled to move in a predetermined vehicle within a virtual 3D space by operating an operating means, wherein said 3D games machine comprises:

a map information storage means in which at least position information and an object number of a segmented map formed by dividing a map of the game space into a predetermined number of segments are stored as segmented map information;

an object image information storage means in which object image information specified by said object number is stored; and a game space setting means for reading said segmented map information from said map information storage means and for setting a game space by reading out said object image information from said object image information storage means on the basis of the thus read-out segmented map information;

and wherein:

said object image information; and whereinsaid game space setting means reads out segmented map information with a smaller number of segments as the distance between said vehicle operated by said player storage means stores a plurality of types of object image information for an object to be displayed, including object image information from which detailed portions are omitted and object image information which has said detailed portions;

said map information and said segment map increases storage means stores, for the same map, a plurality of types of segmented map information including segmented map information that specifies object image information from which said detailed portions are omitted and segmented map information that specifies object image information which has said detailed portions; and said game space setting means reads a plurality of types of segmented map information including segmented map information that specifies object image information from which said detailed portions are omitted and segmented map information that specifies object image information which has said detailed portions, for portions within a map for which detailed rendering is necessary, or segmented map information that specifies object image information from which said detailed portions are omitted, for portions within a map for which detailed rendering is not necessary, and sets a game space by superimposing object images that are read out in accordance with this segmented map information.

3. A 3D games machine as defined in claim 1, wherein:

said game space setting means selects said object image information according to said object number in such a manner that an object that is placed in the segmented map is rendered in a simplified form as the distance between the vehicle operated by the player and said segmented map increases.

4. A 3D games machine as defined in claim 2, wherein:

said game space setting means selects said object image information according to said object number in such a manner that an object that is placed in the segmented map is rendered in a simplified form as the distance between the vehicle operated by the player and said segmented map increases.

5. A 3D games machine as defined in claim 1, further comprising:

means for previously storing a plurality of map segment patterns corresponding to a positional range of said vehicle operated by said player and the player's line-of-sight directional range;

wherein:

said game space setting means sets said game space by selecting one of said plurality of map segment patterns on the basis of the position of said vehicle and the player's line-of-sight direction, while the game is in progress.

6. A 3D games machine as defined in claim 2, further comprising:

means for previously storing a plurality of map segment patterns corresponding to a positional range of said vehicle operated by said player and the player's line-of-sight directional range;

wherein:

said game space setting means sets said game space by selecting one of said plurality of map segment patterns on the basis of the position of said vehicle and the player's line-of-sight direction, while the game is in progress.

7. A 3D games machine as defined in claim 1, wherein:

said game space setting means generates a map segment pattern while the game is in progress, based on the position of said vehicle and the player's line-of-sight direction, and sets a game space on the basis of said map segment pattern.

8. A 3D games machine as defined in claim 2, wherein:

said game space setting means generates a map segment pattern while the game is in progress, based on the position of said vehicle and the player's line-of-sight direction, and sets a game space on the basis of said map segment pattern.

9. A 3D games machine as defined in claim 5, further comprising:

an image synthesizing means for calculating the player's field-of-view image in said virtual 3D space and synthesizing a pseudo-3D image on the basis of game space setting information from said game space setting means;

wherein:

said image synthesizing means omits clipping processing during the synthesizing of said pseudo-3D image, for regions which are always within the player's field-of-view range at any position within the positional range of said vehicle.

10. A 3D games machine as defined in claim 6, further comprising:

an image synthesizing means for calculating the player's field-of-view image in said virtual 3D space and synthesizing a pseudo-3D image on the basis of game space setting information from said game space setting means;

wherein:

said image synthesizing means omits clipping processing during the synthesizing of said pseudo-3D image, for regions which are always within the player's field-of-view range at any position within the positional range of said vehicle.

11. A 3D games machine as defined in claim 7, further comprising:

an image synthesizing means for calculating the player's field-of-view image in said virtual 3D space and synthesizing a pseudo-3D image on the basis of game space setting information from said game space setting means;

wherein:

said image synthesizing means omits clipping processing during the synthesizing of said pseudo-3D image, for regions which are always within the player's field-of-view range at any position within a positional range of said vehicle.

12. A 3D games machine as defined in claim 8, further comprising:

an image synthesizing means for calculating the player's field-of-view image in said virtual 3D space and synthesizing a pseudo-3D image on the basis of game space setting information from said game space setting means;

wherein:

said image synthesizing means omits clipping processing during the synthesizing of said pseudo-3D image, for regions which are always within the player's field-of-view range at any position within a positional range of said vehicle.

13. A 3D games machine as defined in claim 1, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

14. A 3D games machine as defined in claim 2, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

15. A 3D games machine as defined in claim 3, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

16. A 3D games machine as defined in claim 4, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

17. A 3D games machine as defined in claim 5, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

18. A 3D games machine as defined in claim 6, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

19. A 3D games machine as defined in claim 7, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

20. A 3D games machine as defined in claim 8, further comprising:

an image synthesizing means for calculating the player's field-of-view image in said virtual 3D space and synthesizing a pseudo-3D image on the basis of game space setting information from said game space setting means;

wherein:

said image synthesizing means synthesizes said image by giving priority to image information close to the position of said vehicle operated by said player.

* * * * *

UNITED STATES PATENT AND TRADEMARK OFFICE
CERTIFICATE OF CORRECTION

PATENT NO. : 5,616,079
DATED : April 1, 1997
INVENTOR(S) : TAKASHI IWASE et al.

It is certified that error appears in the above-indentified patent and that said Letters Patent is hereby corrected as shown below:

In column 18, cancel beginning with "a game space" in line 40 to and including "detailed portions; and" in lines 63-64, and insert the following:

--a game space setting means for reading said segmented map information from said map information storage means and for setting a game space by reading out said object image information from said object image information storage means on the basis of the thus read-out segmented map information, and whereinsaid game space setting means reads out segmented map information with a smaller number of segments as the distance between said vehicle operated by said player and said segmented map increases; and wherein:

said object image information storage means stores a plurality of types of object image information for an object to be displayed, including object image information from which detailed portions are omitted and object image information which has said detailed portions;

UNITED STATES PATENT AND TRADEMARK OFFICE
CERTIFICATE OF CORRECTION

PATENT NO. : 5,616,079
DATED : April 1, 1997
INVENTOR(S) : TAKASHI IWASE et al.

It is certified that error appears in the above-identified patent and that said Letters Patent is hereby corrected as shown below:

said map information storage means stores, for the same map, a plurality of types of segmented map information including segmented map information that specifies object image information from which said detailed portions are omitted and segmented map information that specifies object image information which has said detailed portions; and--

Signed and Sealed this

First Day of September, 1998

Attest:

BRUCE LEHMAN

Attesting Officer

Commissioner of Patents and Trademarks